United States Patent
Miyauchi

(10) Patent No.: US 8,811,883 B2
(45) Date of Patent: Aug. 19, 2014

(54) PRINTING APPARATUS AND METHOD WITH FIRST AND SECOND TRAY

(75) Inventor: Yasuo Miyauchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 932 days.

(21) Appl. No.: 11/470,326

(22) Filed: Sep. 6, 2006

(65) Prior Publication Data

US 2007/0058187 A1  Mar. 15, 2007

(30) Foreign Application Priority Data

Sep. 9, 2005  (JP) ................ 2005-262371

(51) Int. Cl.
*G06K 15/00*  (2006.01)

(52) U.S. Cl.
USPC ............ 399/405; 271/118; 271/42; 358/1.13; 358/1.18; 399/401

(58) Field of Classification Search
USPC ........... 271/42, 118; 358/1.13, 1.18; 399/401, 399/405
See application file for complete search history.

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,367,482 A * | 1/1983 | Heinzl | 347/43 |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,723,129 A | 2/1988 | Endo et al. | 346/1.1 |
| 4,740,796 A | 4/1988 | Endo et al. | 346/1.1 |
| 5,448,685 A * | 9/1995 | Ogura et al. | 358/1.18 |
| 6,076,919 A | 6/2000 | Shirota et al. | 347/60 |
| 6,099,452 A * | 8/2000 | Hoza et al. | 493/416 |
| 6,354,698 B1 | 3/2002 | Tachihara et al. | 347/56 |
| 6,553,207 B2 * | 4/2003 | Tsusaka et al. | 399/401 |
| 6,612,688 B2 | 9/2003 | Tachihara et al. | 347/56 |
| 7,396,012 B2 * | 7/2008 | Bobrow | 271/185 |
| 2006/0067758 A1 * | 3/2006 | Shibata et al. | 399/365 |

FOREIGN PATENT DOCUMENTS

| | | |
|---|---|---|
| JP | 59-123670 | 7/1984 |
| JP | 5-16365 | 1/1993 |
| JP | 05-75274 | 3/1993 |
| JP | 5-193132 | 8/1993 |
| JP | 07-172654 A | 7/1995 |
| JP | 10-297038 | 11/1998 |
| JP | 11-188870 | 7/1999 |
| JP | 2002-348019 | 12/2002 |
| JP | 2003-145865 | 5/2003 |
| JP | 2005-074792 | 3/2005 |
| JP | 2005-144931 | 6/2005 |

OTHER PUBLICATIONS

Official Notice of Rejection issued in Japanese Patent Application No. 2005-262371, dated Nov. 12, 2010.

* cited by examiner

*Primary Examiner* — Peter K Huntsinger
(74) *Attorney, Agent, or Firm* — Fitzpatrick, Cella, Harper & Scinto

(57) ABSTRACT

The present invention provides a printing apparatus and a printing method, in which a very thick and rigid printing medium such as board paper can be conveyed with stable conveyance accuracy, and in which a high-quality image can be printed thereon. In order to achieve this, paper on a front tray is conveyed onto a rear tray approximately along a plane containing a position on a platen, and then the paper is conveyed onto the front tray through the position on the platen. When the paper passes through the position on the platen, an image is printed on the paper.

9 Claims, 24 Drawing Sheets

PRINTING APPARATUS AND METHOD WITH FIRST AND SECOND TRAY

BACKGROUND OF THE INVENTION

1. Field of the Invention

The present invention relates to a printing apparatus and printing method in which an image can be printed on a relatively rigid printing medium such as cardboard.

2. Description of the Related Art

Heretofore, there have been printing apparatuses including a path for conveying relatively thick paper (cardboard) through a printing position, in addition to a path for conveying relatively thin ordinary paper through the printing position. The path for conveying cardboard is, for example, configured to convey cardboard inserted from the back side of the printing apparatus to the printing position and to eject the cardboard having an image printed thereon at the printing position from the front side of the printing apparatus. However, it is very difficult to insert the cardboard from the back side of the printing apparatus.

In Japanese Patent Application Laid-open No. 2002-348019, a printing apparatus is described which includes a switchback path for conveying cardboard while curving it as little as possible. The printing apparatus has a constitution in which the switchback path is provided at an intermediate point along a path for feeding paper from automatic paper feed means. When ordinary paper is used, the paper is turned over to be conveyed to a printing position. When cardboard is used, the cardboard is conveyed to the printing position through the switchback path while being curved as little as possible.

However, in such a printing apparatus, though cardboard as a printing medium of a certain thickness can be conveyed, it is inevitable that the cardboard will be curved. Accordingly, very thick board paper or the like cannot be conveyed. Moreover, even in the case of cardboard capable of being conveyed, since the cardboard is curved with a certain curvature during the conveyance, there are cases where back tension occurs due to the strong rigidity of the cardboard. In such a case, there is a possibility that the conveyance distance of the cardboard may partially changes to cause image deterioration.

An object of the present invention is to provide a printing apparatus and method, in which a very thick and rigid printing medium such as board paper can be conveyed with stable conveyance accuracy, and in which a high-quality image can be printed thereon.

SUMMARY OF THE INVENTION

In a first aspect of the present invention, there is provided a printing apparatus, which conveys a printing medium through a printing position in a printing apparatus body, and which prints an image on the printing medium at the printing position, the printing apparatus comprising:
first and second trays positioned approximately in a plane containing the printing position, the first and second trays being capable of having the printing medium mounted thereon, and
means for conveying the printing medium on the first tray onto the second tray, and then conveying the printing medium onto the first tray through the printing position, along a conveyance path positioned approximately in the plane.

In a second aspect of the present invention, there is provided a method of printing an image on a printing medium at a printing position in a printing apparatus body by conveying the printing medium through the printing position, the method comprising the steps of:
using a first tray and a second tray positioned approximately in a plane containing the printing position, the first and second trays being capable of having the printing medium mounted thereon;
conveying the printing medium on the first tray onto the second tray, and then conveying the printing medium onto the first tray through the printing position along a conveyance path positioned approximately in the plane; and
printing an image on the printing medium at the printing position when the printing medium is conveyed from on the second tray through the printing position onto the first tray.

According to the present invention, since a printing medium is conveyed approximately along a plane containing the printing position, a printing medium such as very thick and rigid cardboard such as board paper can be stably conveyed without being curved, and a high-quality image can be printed on the printing medium at the printing position. Moreover, after the printing medium is conveyed from on the first tray onto the second tray once, the printing medium is conveyed onto the first tray through the printing position. Thus, on the first tray, the feeding of a printing medium before printing an image and the ejection of the printing medium after printing the image can be performed.

Moreover, the provision of the first tray on the front side of the printing apparatus body makes it possible to feed a printing medium from the front side and to discharge the printing medium to the front side. Thus, a printing apparatus having very good operability can be provided.

In addition, by making the size of a mounting surface of the second tray for mounting the printing medium adjustable, the mounting surface can be adjusted depending on the size or the like of a printing medium. Thus, it is possible to avoid a situation, in which a printing medium protrudes from the second tray, or in which a printing medium hits against an outside obstacle to be damaged.

Furthermore, in the case where the second tray is provided on the back side of the printing apparatus body, the bottom surface of the printing apparatus body on the back side thereof has wheels which are grounded when the front side thereof is raised. Thus, when the footprint of the second tray is ensured, the printing apparatus body can be easily moved.

Further features of the present invention will become apparent from the following description of exemplary embodiments (with reference to the attached drawings).

DESCRIPTION OF THE EMBODIMENTS

Figure 1:
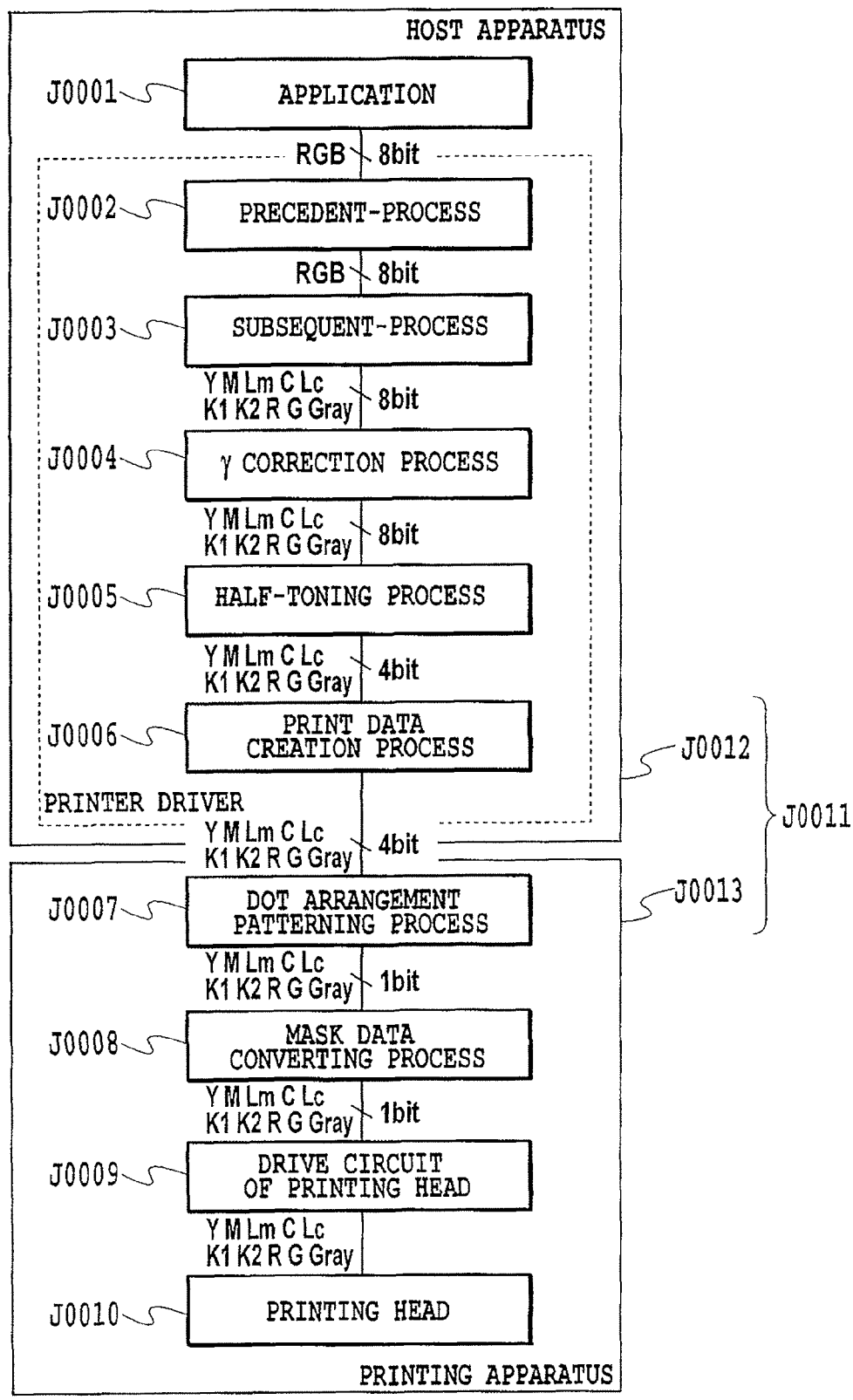
FIG. 1 is a view for explaining a flow of image data processing in a printing system which is employed in one embodiment of the present invention.

Descriptions will be provided below for embodiments of the present invention by referring to the drawings.
1. Basic Configuration
1.1 Outline of Printing System FIG. 1 is a diagram for explaining a flow in which image data are processed in a printing system to which an embodiment of the present invention is applied. This printing system J0011 includes a host apparatus J0012 which generates image data indicating an image to be printed, and which sets up a user interface (UI) for generating the data and so on. In addition, the printing system J0011 includes a printing apparatus J0013 which prints an image on a printing medium on the basis of the image data generated by the host apparatus J0012. The printing apparatus J0013 performs a printing operation by use of 10 color inks of cyan (C), light cyan (Lc), magenta (M), light magenta (Lm), yellow (Y), red (R), green (G), black 1 (K1), black 2 (K2) and gray (Gray). To this end, a printing head H1001 for ejecting these 10 color inks is used for the printing apparatus J0013. These 10 color inks are pigmented inks respectively including ten color pigments as the color materials thereof.

Programs operated with an operating system of the host apparatus J0012 include an application and a printer driver. An application J0001 executes a process of generating image data with which the printing apparatus makes a print. Personal computers (PC) are capable of receiving these image data or pre-edited data which is yet to process by use of various media. By means of a CF card, the host apparatus according to this embodiment is capable of populating, for example, JPEG-formatted image data associated with a photo taken with a digital camera. In addition, the host apparatus according to this embodiment is capable of populating, for example, TIFF-formatted image data read with a scanner and image data stored in a CD-ROM. Moreover, the host apparatus according to this embodiment is capable of capturing data from the Web through the Internet. These captured data are displayed on a monitor of the host apparatus. Thus, an edit, a process or the like is applied to these captured data by means of the application J0001. Thereby, image data R, G and B are generated, for example, in accordance with the sRGB specification. A user sets up a type of printing medium to be used for making a print, a printing quality and the like through a UI screen displayed on the monitor of the host apparatus. The user also issues a print instruction through the UI screen. Depending on this print instruction, the image data R, G and B are transferred to the printer driver.

The printer driver includes a precedent process J0002, a subsequent process J0003, a g correction process J0004, a half-toning process J0005 and a print data creation process J0006 as processes performed by itself. Brief descriptions will be provided below for these processes J0002 to J0006.
(A) Precedent Process The precedent process J0002 performs mapping of a gamut. In this embodiment, data are converted for the purpose of mapping the gamut reproduced by image data R, G and B in accordance with the sRGB specification onto a gamut to be produced by the printing apparatus. Specifically, a respective one of image data R, G and B deal with 256 gradations of the respective one of colors which are represented by 8 bits. These image data R, G and B are respectively converted to 8-bit data R, G and B in the gamut of the printing apparatus J0013 by use of a three-dimensional LUT.
(B) Subsequent Process On the basis of the 8-bit data R, G and B obtained by mapping the gamut, the subsequent process J0003 obtains 8-bit color separation data on each of the 10 colors. The 8-bit color separation data correspond to a combination of inks which are used for reproducing a color represented by the 8-bit data R, G and B. In other words, the subsequent process J0003 obtains color separation data on each of Y, M, Lm, C, Lc, K1, K2, R, G, and Gray. In this embodiment, like the precedent process, the subsequent process is carried out by using the three dimensional LUT, simultaneously using an interpolating operation.
(C) γ Correction Process The γ correction J0004 converts the color separation data on each of the 10 colors which have been obtained by the subsequent process J0003 to a tone value (gradation value) representing the color. Specifically, a one-dimensional LUT corresponding to the gradation characteristic of each of the color inks in the printing apparatus J0013 is used, and thereby a conversion is carried so that the color separation data on the 10 colors can be linearly associated with the gradation characteristics of the printer.

(D) Half-toning Process

The half-toning process J0005 quantizes the 8-bit color separation data on each of Y, M, Lm, C, Lc, K1, K2, R, G and Gray to which the γ correction process has been applied so as to convert the 8-bit separation data to 4-bit data. In this embodiment, the 8-bit data dealing with the 256 gradations of each of the 10 colors are converted to 4-bit data dealing with 9 gradations by use of the error diffusion method. The 4-bit data are data which serve as indices each for indicating a dot arrangement pattern in a dot arrangement patterning process in the printing apparatus.

(E) Print Data Creation Process

The last process performed by the printer driver is the print data creation process J0006. This process adds information on print control to data on an image to be printed whose contents are the 4-bit index data, and thus creates print data.

Figure 2:
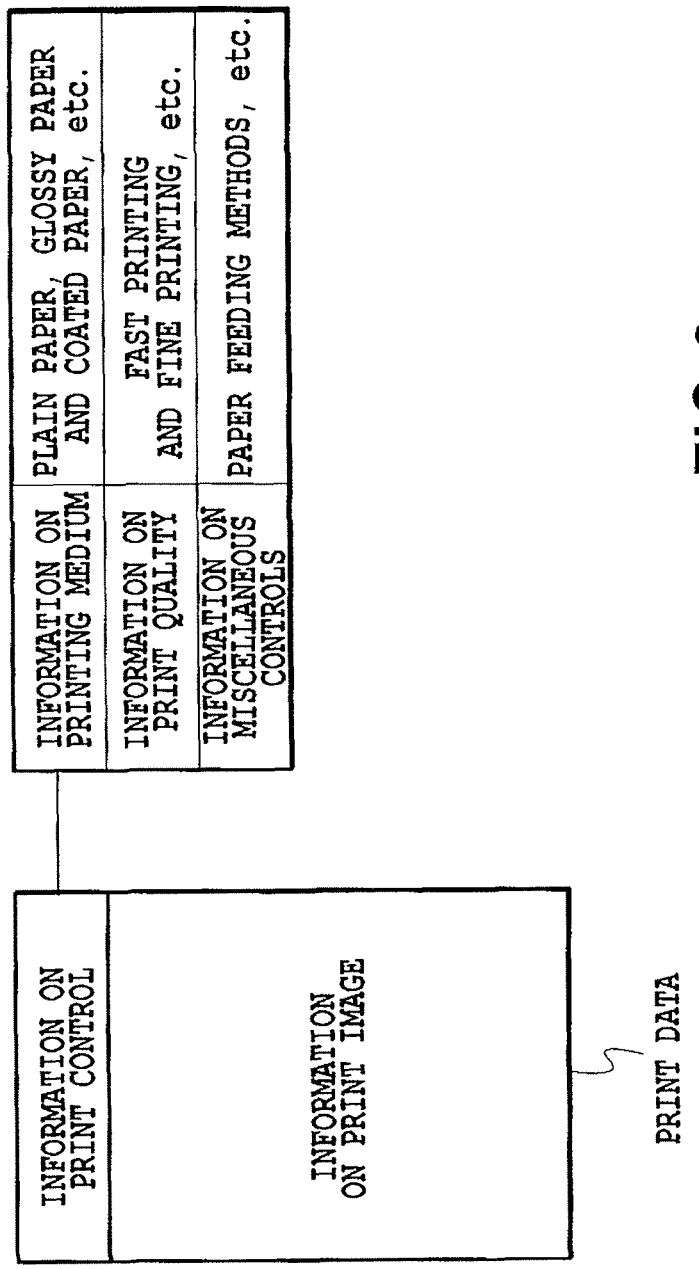
FIG. 2 is an explanatory diagram showing an example of a structure of print data which a printer driver of a host apparatus passes to a printing apparatus in the printing system of FIG. 1.

FIG. 2 is a diagram showing an example of a configuration of the print data. The print data are configured of the information on print control and the data on an image to be printed. The information on print control is in charge of controlling a printing operation. The data on an image to be printed indicates an image to be printed (the data are the foregoing 4-bit index data). The information on print control is configured of "information on printing media," "information on print qualities," and "information on miscellaneous controls" including information on paper feeding methods or the like. Types of printing media on which to make a print are described in the information on printing media. One type of printing medium selected out of a group of plain paper, glossy paper, a post card, a printable disc and the like is specified in the information on printing media. Print qualities to be sought are described in the information on print qualities. One type of print quality selected out of a group of "fine (high-quality print)," "normal," "fast (high-speed print)" and the like is specified in the information on print qualities. Note that these pieces of information on print control are formed on the basis of contents which a user designates through the UI screen in the monitor of the host apparatus J0012. In addition, image data originated in the half-toning process J0005 are described in the data on an image to be printed. The print data thus generated are supplied to the printing apparatus J0013.

The printing apparatus J0013 performs a dot arrangement patterning process J0007 and a mask data converting process J0008 on the print data which have been supplied from the host apparatus J0012. Descriptions will be provided next for the dot arrangement patterning process J0007 and the mask data converting process J0008.

(F) Dot Arrangement Patterning Process

In the above-described half-toning process J0005, the number of gradation levels is reduced from the 256 tone values dealt with by multi-valued tone information (8-bit data) to the 9 tone values dealt with by information (4-bit data). However, data with which the printing apparatus J0013 is actually capable of making a print are binary data (1-bit) data on whether or not an ink dot should be printed. Taken this into consideration, the dot arrangement patterning process J0007 assigns a dot arrangement pattern to each pixel represented by 4-bit data dealing with gradation levels 0 to 8 which are an outputted value from the half-toning process J0005. The dot arrangement pattern corresponds to the tone value (one of the levels 0 to 8) of the pixel. Thereby, whether or not an ink dot should be printed (whether a dot should be on or off) is defined for each of a plurality of areas in each pixel. Thus, 1-bit binary data indicating "1 (one)" or "0 (zero)" are assigned to each of the areas of the pixel. In this respect, "1 (one)" is binary data indicating that a dot should be printed. "0 (zero)" is binary data indicating that a dot should not be printed.

Figure 3:
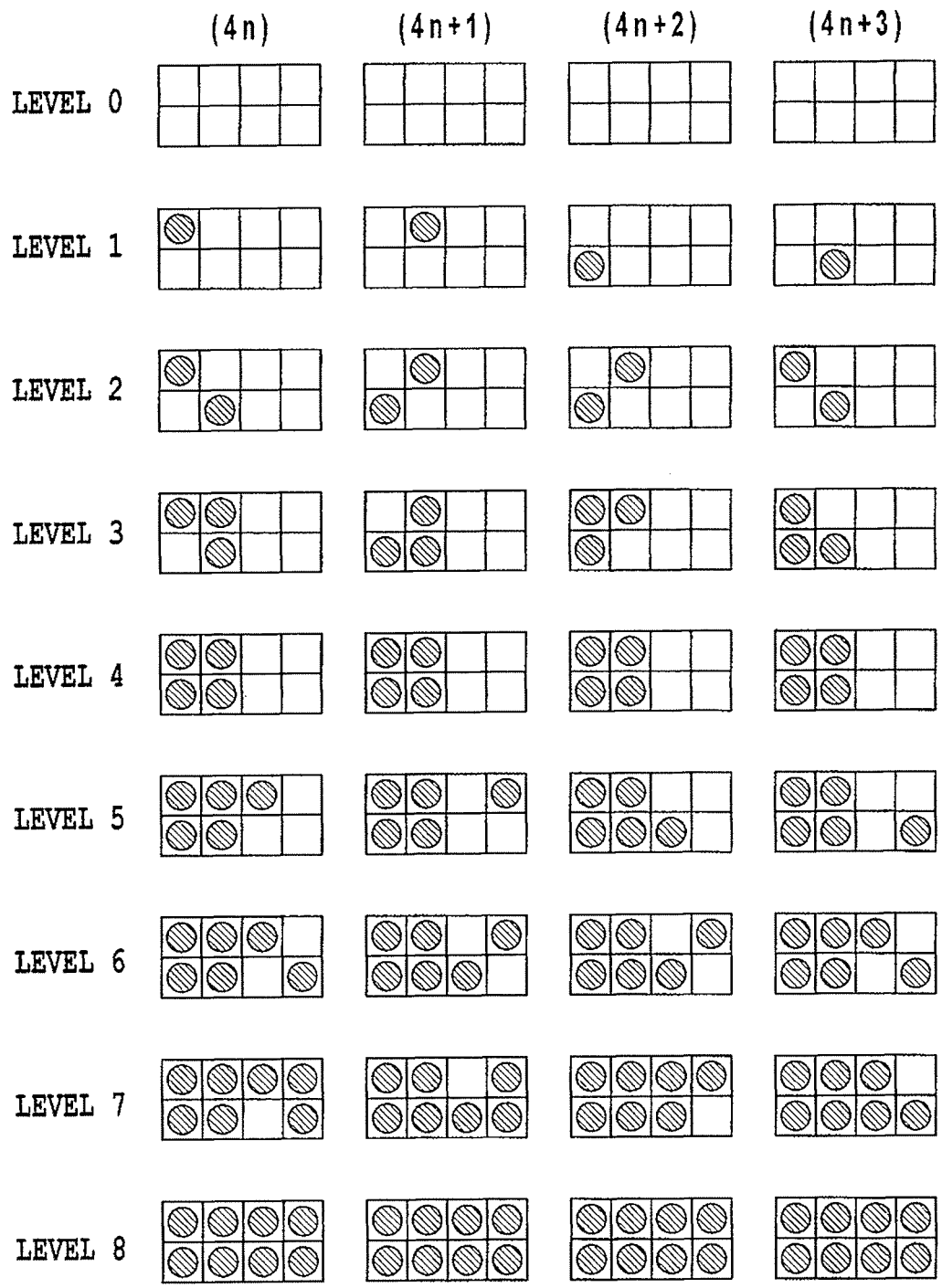
FIG. 3 is a diagram showing output patterns respectively corresponding to input levels which are converted in a dot arrangement patterning process by the printing apparatus used in the embodiment.

FIG. 3 shows output patterns corresponding to input levels 0 to 8. These output patterns are obtained through the conversion performed in the dot arrangement patterning process of the embodiment. Level numbers in the left column in the diagram correspond respectively to the levels 0 to 8 which are the outputted values from the half-toning process in the host apparatus. Regions each configured of 2 vertical areas×4 horizontal areas are shown to the right of this column. Each of the regions corresponds to a region occupied by one pixel receiving an output from the half-toning process. In addition, each of the areas in one pixel corresponds to a minimum unit for which it is specified whether the dot thereof should be on or off. Note that, in this description, a "pixel" means a minimum unit which is capable of representing a gradation, and also means a minimum unit to which the image processes (the precedent process, the subsequent process, the γ correction process, the half-toning process and the like) are applied using multi-valued data represented by the plurality of bits.

In this figure, an area in which a circle is drawn denotes an area where a dot is printed. As the level number increases, the number of dots to be printed increases one-by-one. In this embodiment, information on density of an original image is finally reflected in this manner.

From the left to the right, (4n) to (4n+3) denotes horizontal positions of pixels, each of which receives data on an image to be printed. An integer not smaller than 1 (one) is substituted for n in the expression (4n) to (4n+3). The patterns listed under the expression indicate that a plurality of mutually-different patterns are available depending on a position where a pixel is located even though the pixel receives an input at the same level. In other words, the configuration is that, even in a case where a pixel receives an input at one level, the four types of dot arrangement patterns under the expression (4n) to (4n+3) at the same level are assigned to the pixel in an alternating manner.

In FIG. 3, the vertical direction is a direction in which the ejection openings of the printing head are arrayed, and the horizontal direction is a direction in which the printing head moves. The configuration enabling a print to be made using the plurality of different dot arrangement patterns for one level brings about the following two effects. First, the number of times that ejection is performed can be equalized between two nozzles in which one nozzle is in charge of the patterns located in the upper row of the dot arrangement patterns at one level, and the other nozzle is in charge of the patterns located in the lower row of the dot arrangement patterns at the same level. Secondly, various noises unique to the printing apparatus can be disgregated.

When the above-described dot arrangement patterning process is completed, the assignment of dot arrangement patterns to the entire printing medium is completed.

(G) Mask Data Converting Process

In the foregoing dot arrangement patterning process J0007, whether or not a dot should be printed is determined for each of the areas on the printing medium. As a result, if binary data indicating the dot arrangement are inputted to a drive circuit J0009 of the printing head H1001, a desired image can be printed. In this case, what is termed as a one-pass print can be made. The one-pass print means that a print to be made for a single scan region on a printing medium is completed by the printing head H1001 moving once. Alternatively, what is termed as a multi-pass print can be made. The multi-pass print means that a print to be made for a single scan region on the printing medium is completed by the printing head moving a plurality of times. Here, descriptions will be provided for a mask data converting process, taking an example of the multi-pass print.

Figure 4:
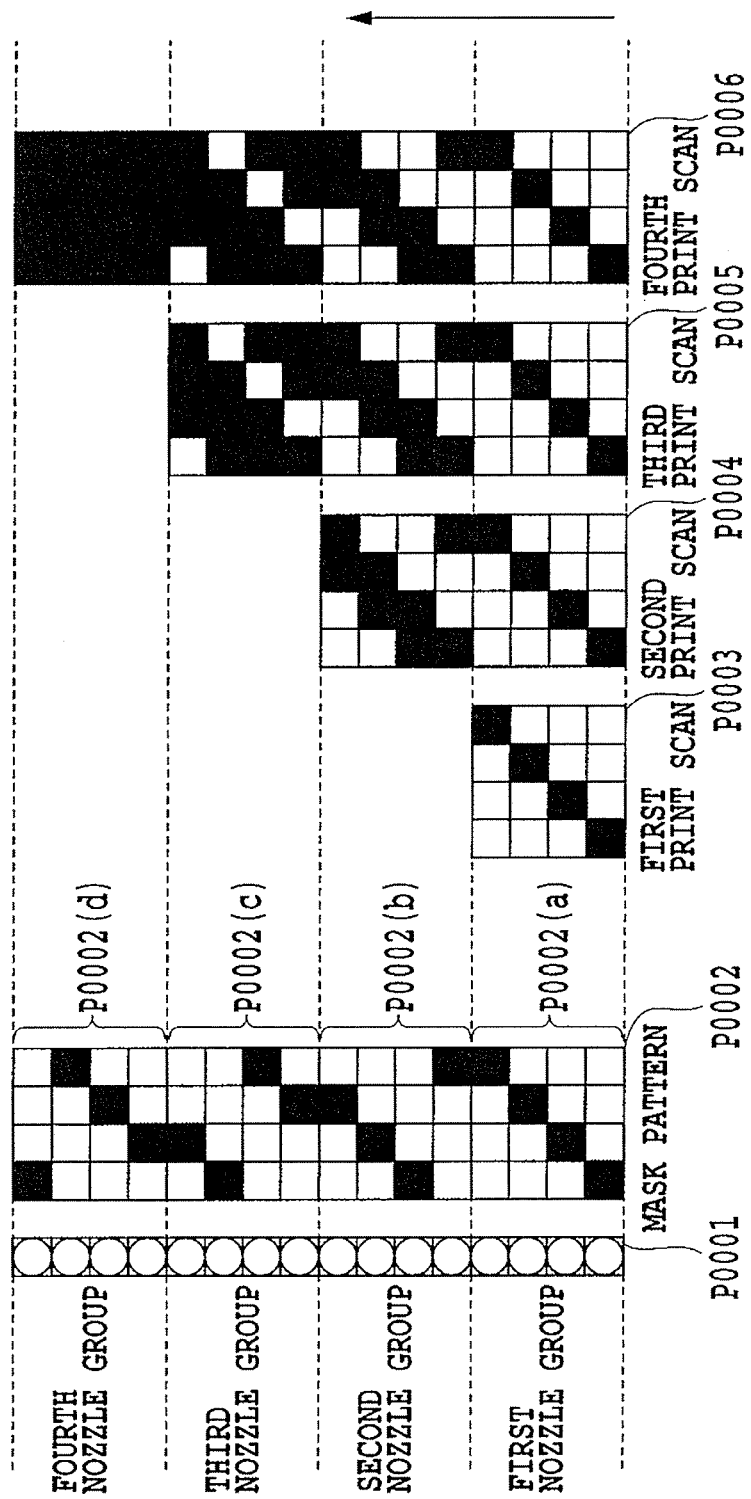
FIG. 4 is a schematic diagram for explaining a multipath printing method executed by the printing apparatus used in the embodiment.

FIG. 4 is a schematic diagram showing the printing head and print patterns for the purpose of describing the multi-pass printing method. The print head H1001 applied to this embodiment actually has 768 nozzles. For the sake of convenience, however, descriptions will be provided for the printing head and the print patterns, supposing that the printing head H1001 has 16 nozzles. The nozzles are divided into a first to a fourth nozzle groups. Each of the four nozzle groups includes four nozzles. Mask P0002 are configured of a first to a fourth mask patterns P0002(a) to P0002(d). The first to the fourth mask patterns P0002(a) to P0002(d) define the respective areas in which the first to the fourth nozzle groups are capable of making a print. Blackened areas in the mask patterns indicate printable areas, whereas whitened areas in the mask patterns indicate unprinted areas. The first to the fourth mask patterns are complementary to one another. The configuration is that, when these four mask patterns are superposed over one another, a print to be made in a region corresponding to a 4×4 area is completed.

Patterns denoted by reference numerals P0003 to P0006 show how an image is going to be completed by repeating a print scan. Each time a print scan is completed, the printing medium is transferred by a width of the nozzle group (a width of four nozzles in this figure) in a direction indicated by an arrow in the figure. In other words, the configuration is that an image in any same region (a region corresponding to the width of each nozzle region) on the printing medium is completed by repeating the print scan four times. Formation of an image in any same region on the printing medium by use of multiple nozzle groups by repeating the scan the plurality of times in the afore-mentioned manner makes it possible to bring about an effect of reducing variations characteristic of the nozzles, and an effect of reducing variations in accuracy in transferring the printing medium.

Figure 5:
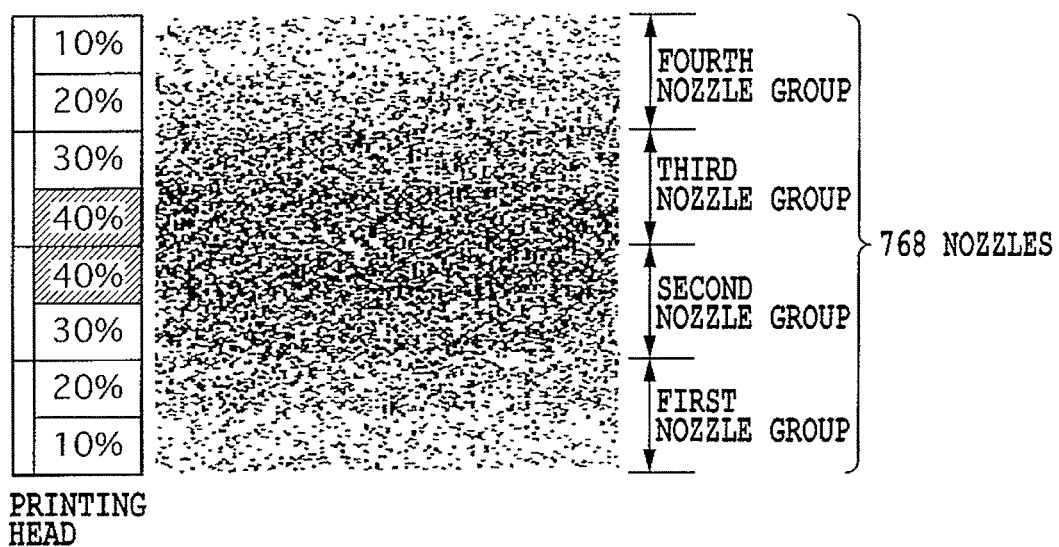
FIG. 5 is an explanatory view showing one example of a mask pattern applied to the multipath printing method executed by the printing apparatus used in the embodiment.

FIG. 5 shows an example of mask which is capable of being actually applied to this embodiment. The printing head H1001 to which this embodiment is applied has 768 nozzles, and 192 nozzles belong to each of the four nozzle groups. As for the size of the mask, the mask has 768 areas in the vertical direction, and this number is equal to the number of nozzles. The mask has 256 areas in the horizontal direction. The mask has a configuration that the four mask patterns respectively corresponding to the four nozzle groups maintain a complementary relationship among themselves.

In the case of the ink jet printing head applied to this embodiment, which ejects a large number of fine ink droplets by means of a high frequency, it has been known that an air flow occurs in a neighborhood of the printing part during printing operation. In addition, it has been proven that this air flow particularly affects a direction in which ink droplets are ejected from nozzles located in the end portions of the printing head. For this reason, in the case of the mask patterns of this embodiment, a distribution of printable ratios is biased depending on which nozzle group a region belongs to, and on where a region is located in each of the nozzle groups, as seen from FIG. 5. As shown in FIG. 5, by employing the mask patterns having a configuration which makes the printable ratios of the nozzles in the end portions of the printing head smaller than those of nozzles in a central portion thereof, it is possible to make inconspicuous an adverse effect stemming from variations in positions where ink droplets ejected from the nozzles in the end portions of the printing head are landed.

Note that a printable ratio specified by a mask pattern is as follows. A printable ratio of a mask pattern is a percentage denomination of a ratio of the number of printable areas constituting the mask pattern (blackened areas in the mask pattern P0002(a) to P0002(d) of FIG. 4) to the sum of the number of printable areas and the number of unprintable areas constituting the mask pattern (the whitened areas in the mask patterns P0002(a) to P0002(d) of FIG. 4). In other words, a printable ratio (%) of a mask pattern is expressed by $$M \div (M+N) \times 100$$

where M denotes the number of printable areas constituting the mask pattern and N denotes the number of unprintable areas constituting the mask pattern.

In this embodiment, data for the mask as shown in FIG. 5 are stored in memory in the main body of the printing apparatus. The mask data converting process J0008 performs the AND process on the mask data with the binary data obtained in the foregoing dot arrangement patterning process. Thereby, binary data to be a print object in each print scan are determined. Subsequently, the binary data are transferred to the driving circuit J0009. Thus, the printing head H1001 is driven, and hence inks are ejected in accordance with the binary data.

FIG. 1 shows that the host apparatus J0012 is configured to perform the precedent process J0002, the subsequent process J0003, the γ correction process J0004, the half-toning process J0005 and the print data creation process J0006. In addition, FIG. 1 shows that the printing apparatus J0013 is designed to perform the dot arrangement patterning process J0007 and the mask data converting process J0008. However, the present invention is not limited to this embodiment. For example, the present invention may be carried out as an embodiment in which parts of the processes J0002 to J0005 are designed to be performed by the printing apparatus J0013 instead of by the host apparatus J0012. Otherwise, the present invention may be carried out as an embodiment in which all of these processes are designed to be performed by the host apparatus J0012. Alternately, the present invention may be carried out as an embodiment in which the processes J0002 to J0008 are designed to be performed by the printing apparatus J0013.

1.2 Configuration of Mechanisms

Descriptions will be provided for a configuration of the mechanisms in the printing apparatus to which this embodiment is applied. The main body of the printing apparatus of this embodiment is divided into a paper feeding section, a paper conveying section, a paper discharging section, a carriage section, a flat-pass printing section and a cleaning section from a viewpoint of functions performed by the mechanisms. These mechanisms are contained in an outer case.

Figure 6:
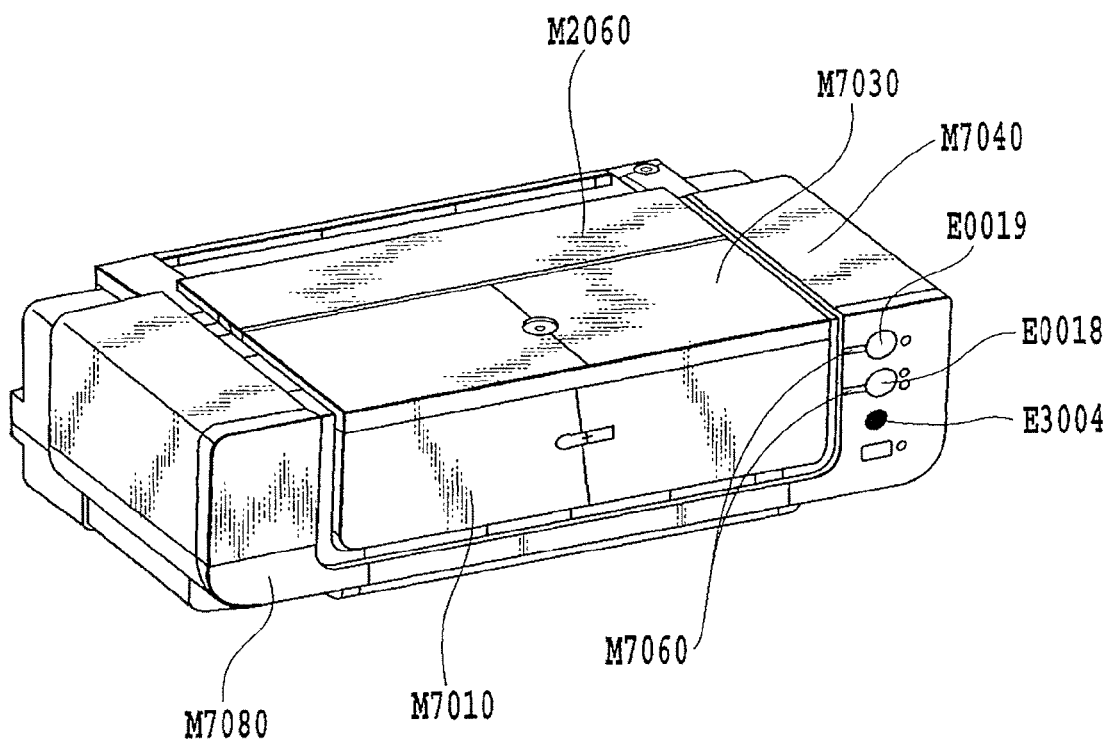
FIG. 6 is a perspective view of the printing apparatus used in the embodiment as seen from the front when not in use.
Figure 7:
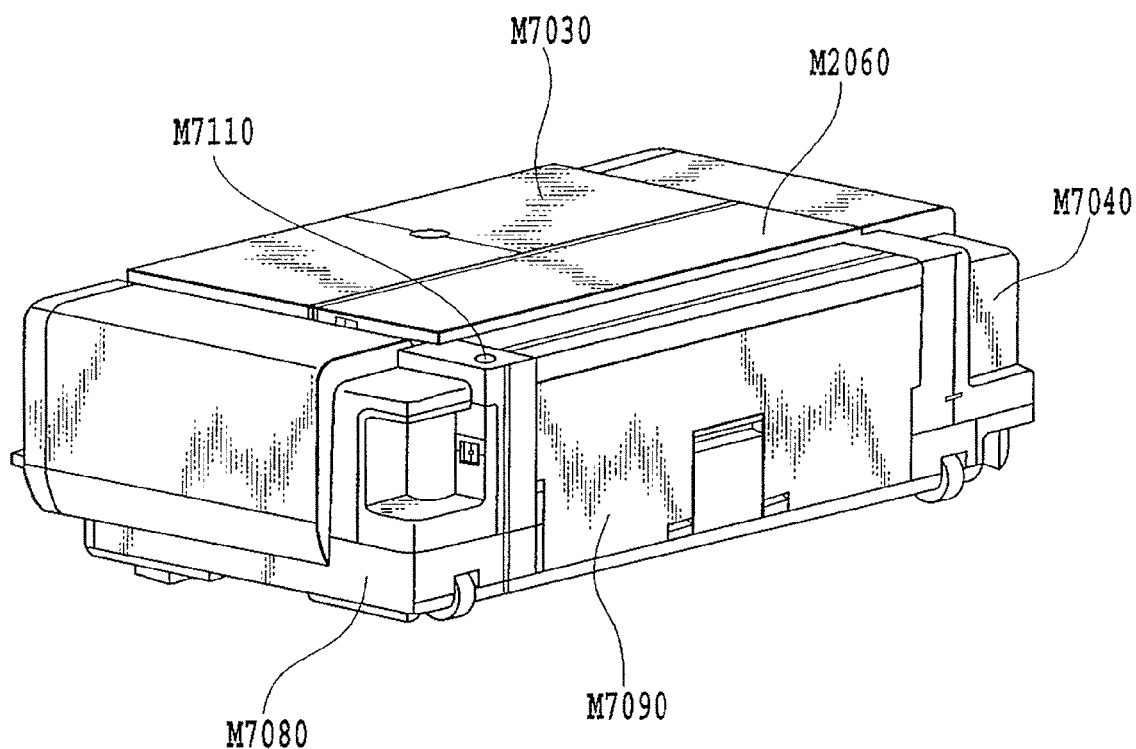
FIG. 7 is a perspective view of the printing apparatus used in the embodiment as seen from the back when not in use.
Figure 8:
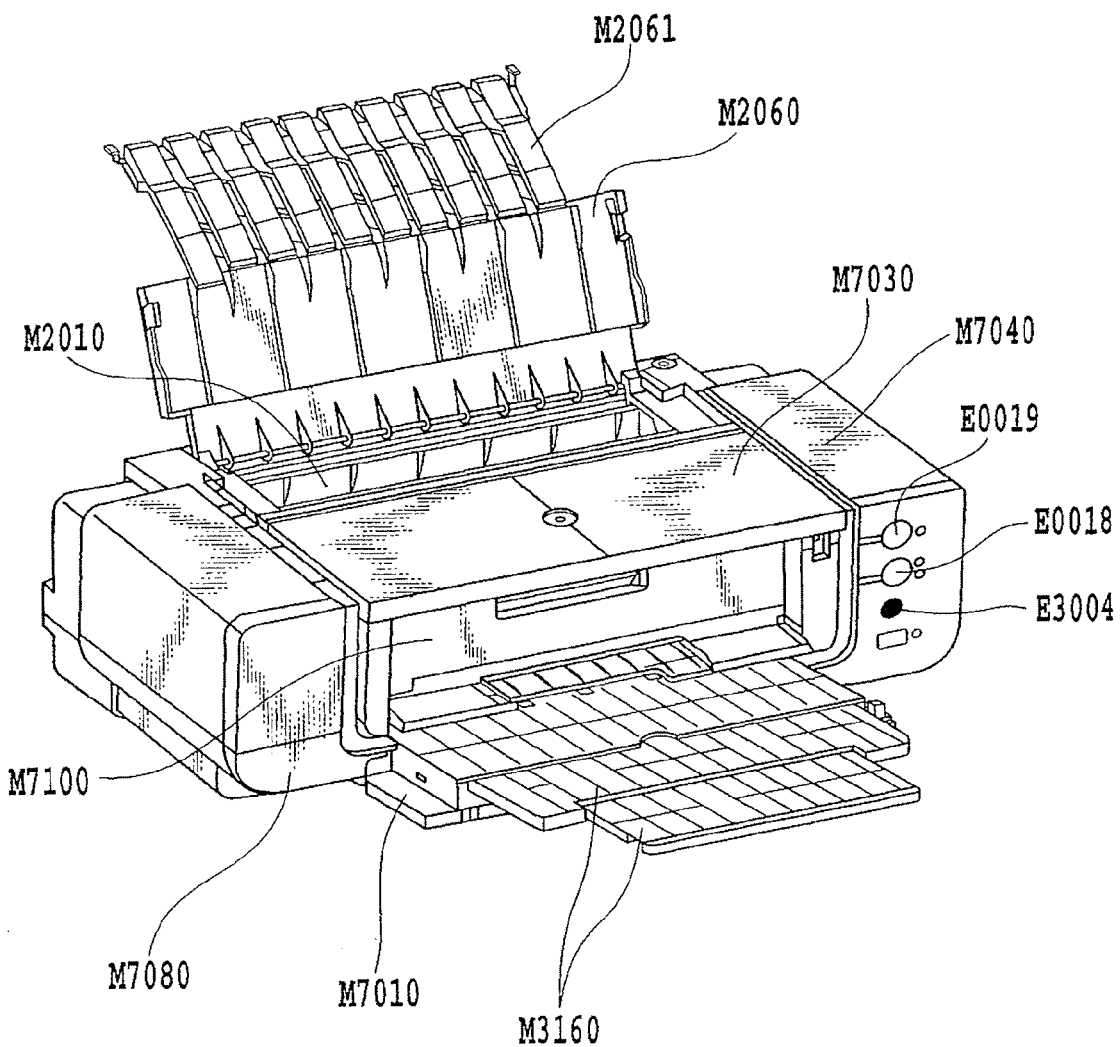
FIG. 8 is a perspective view of the printing apparatus used in the embodiment as seen from the front when in use.
Figure 9:
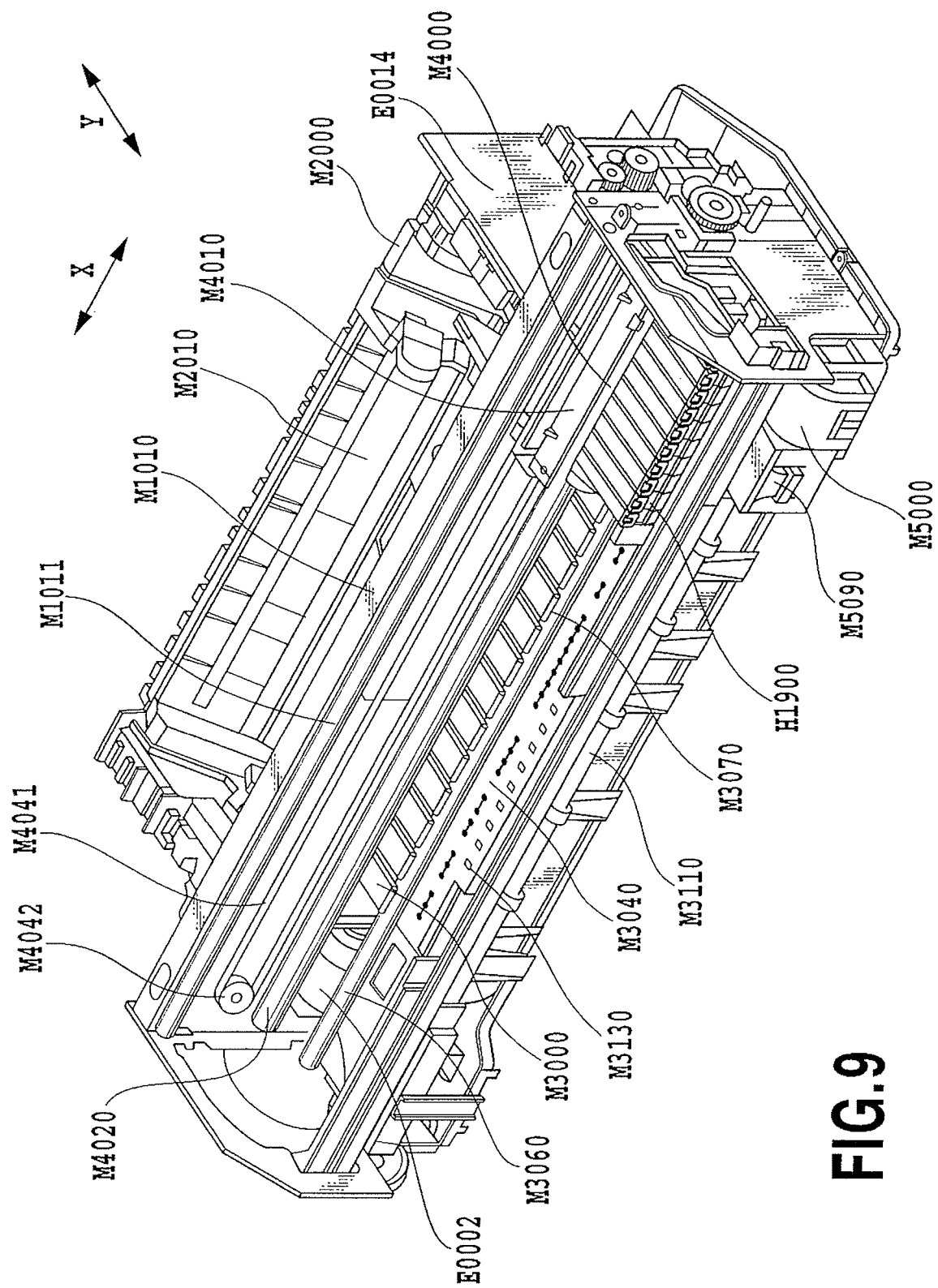
FIG. 9 is a view for explaining an internal mechanism of the printing apparatus body used in the embodiment and is a perspective view as the printing apparatus body is seen from upper right.
Figure 10:
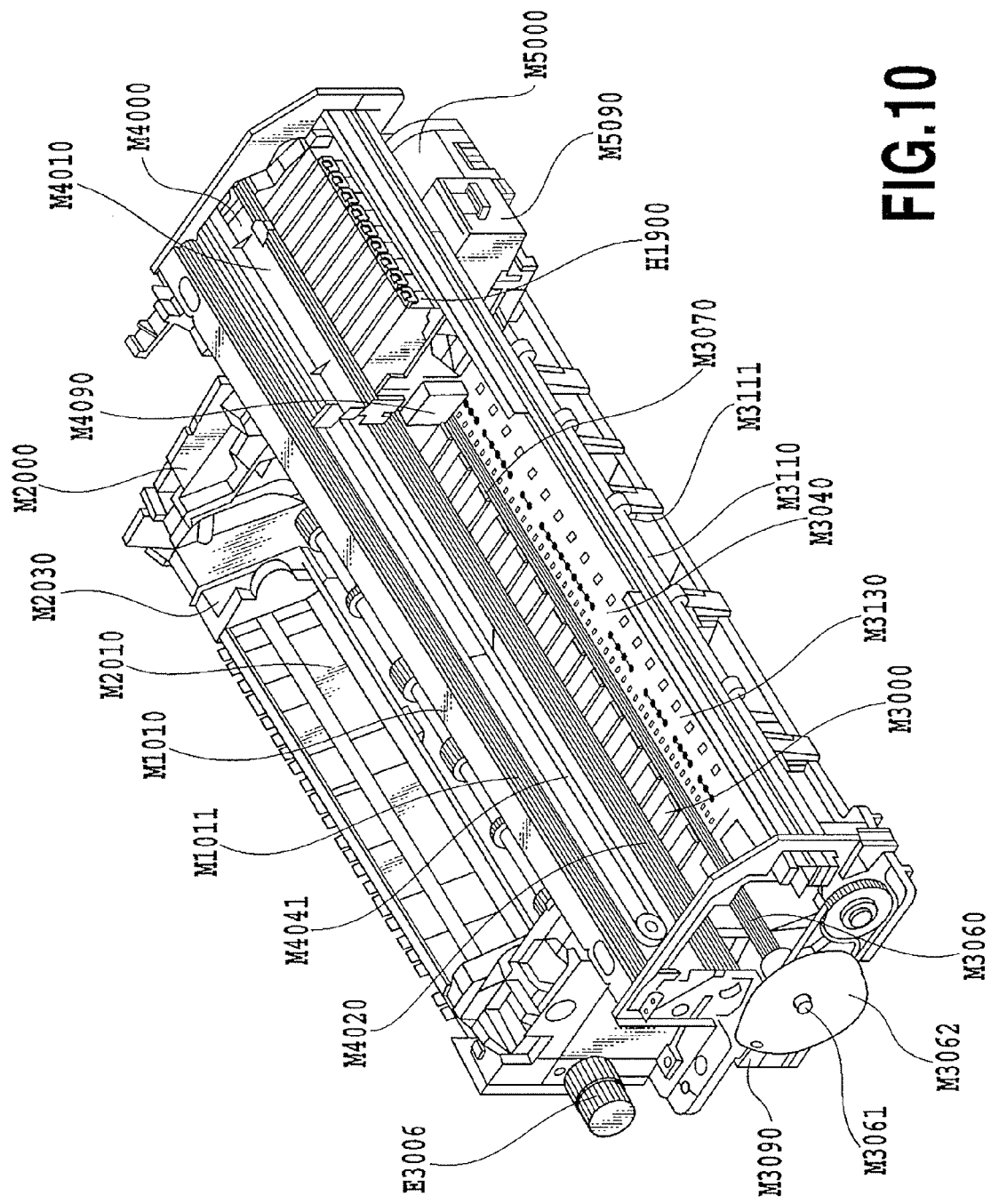
FIG. 10 is a view for explaining the internal mechanism of the printing apparatus body used in the embodiment and is a perspective view as the printing apparatus body is seen from upper left.
Figure 11:
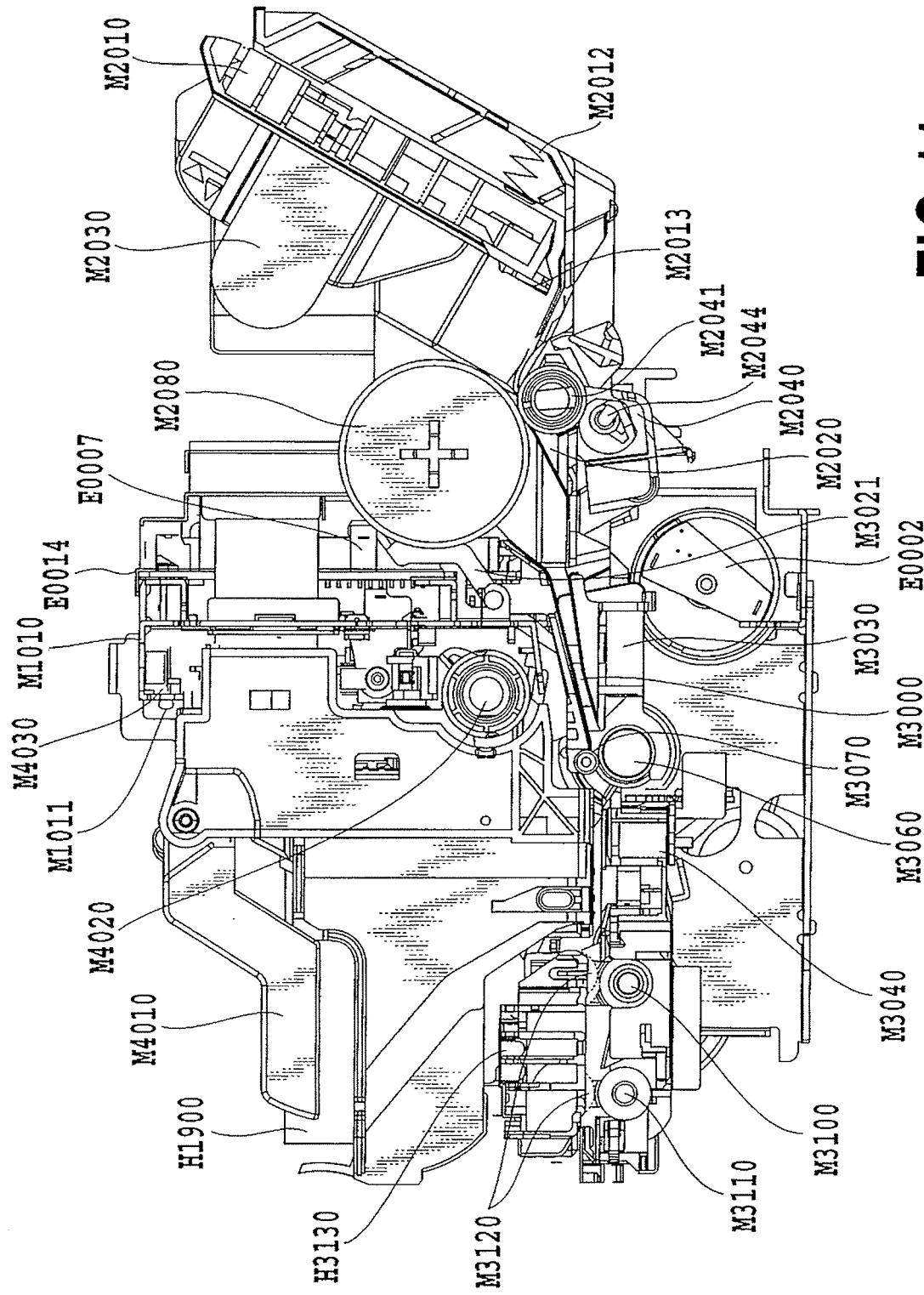
FIG. 11 is a cross-sectional side view for explaining the internal mechanism of the printing apparatus body used in the embodiment.
Figure 12:
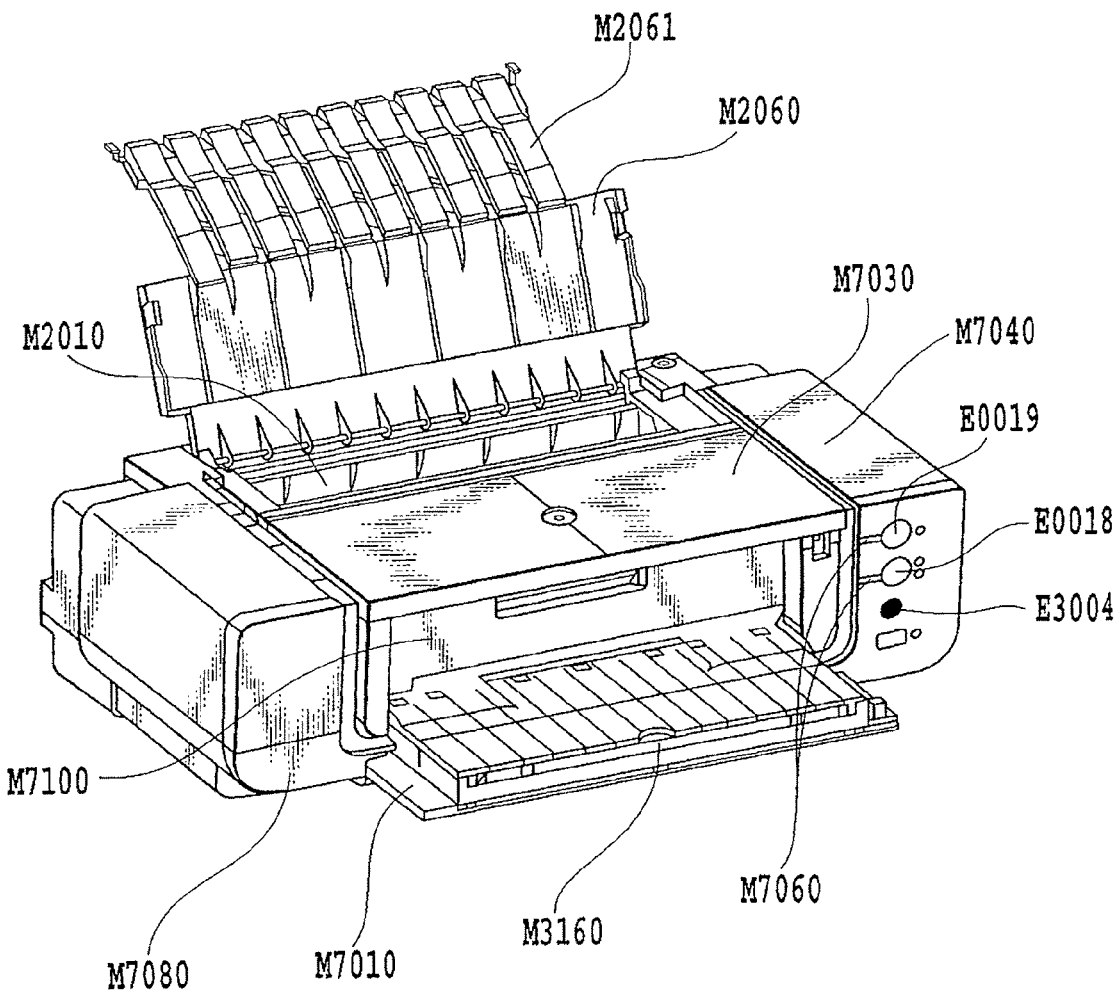
FIG. 12 is a perspective view of the printing apparatus used in the embodiment as seen from the front at the time of flat-pass printing.
Figure 13:
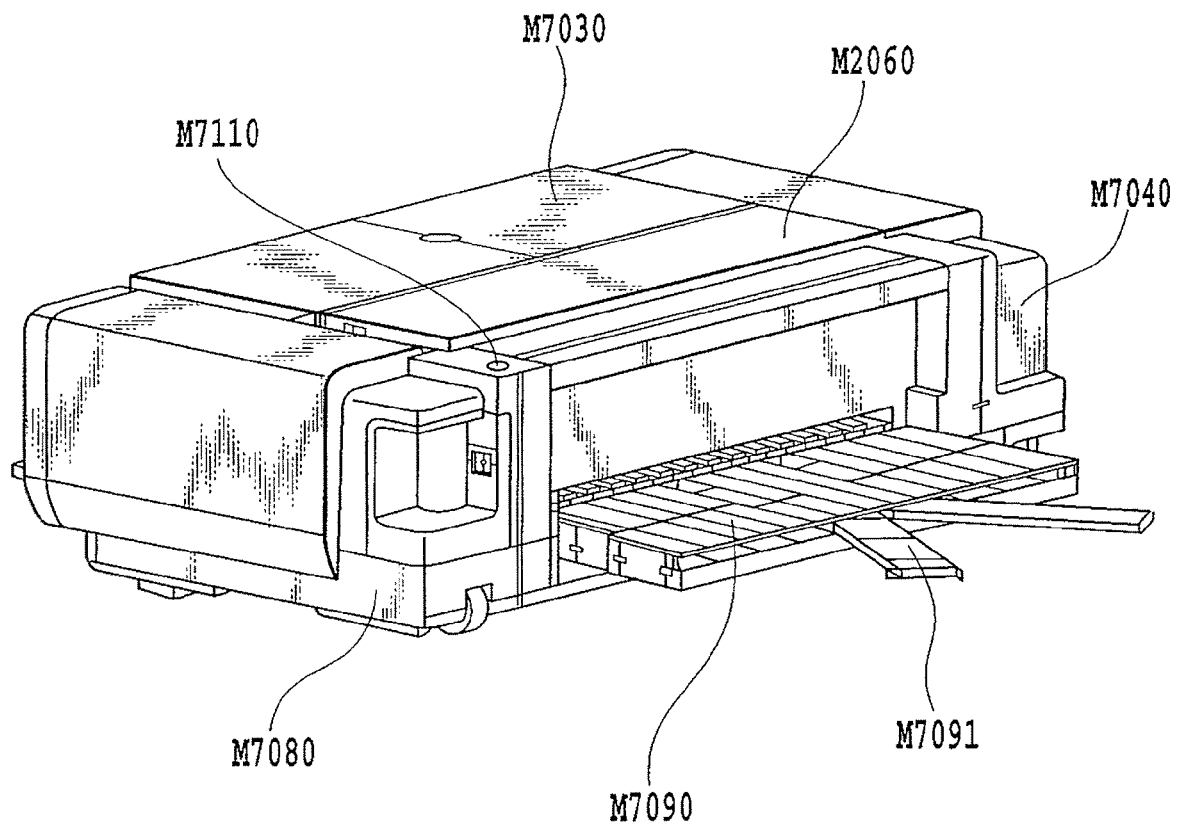
FIG. 13 is a perspective view of the printing apparatus used in the embodiment as seen from the back at the time of flat-pass printing.
Figure 14:
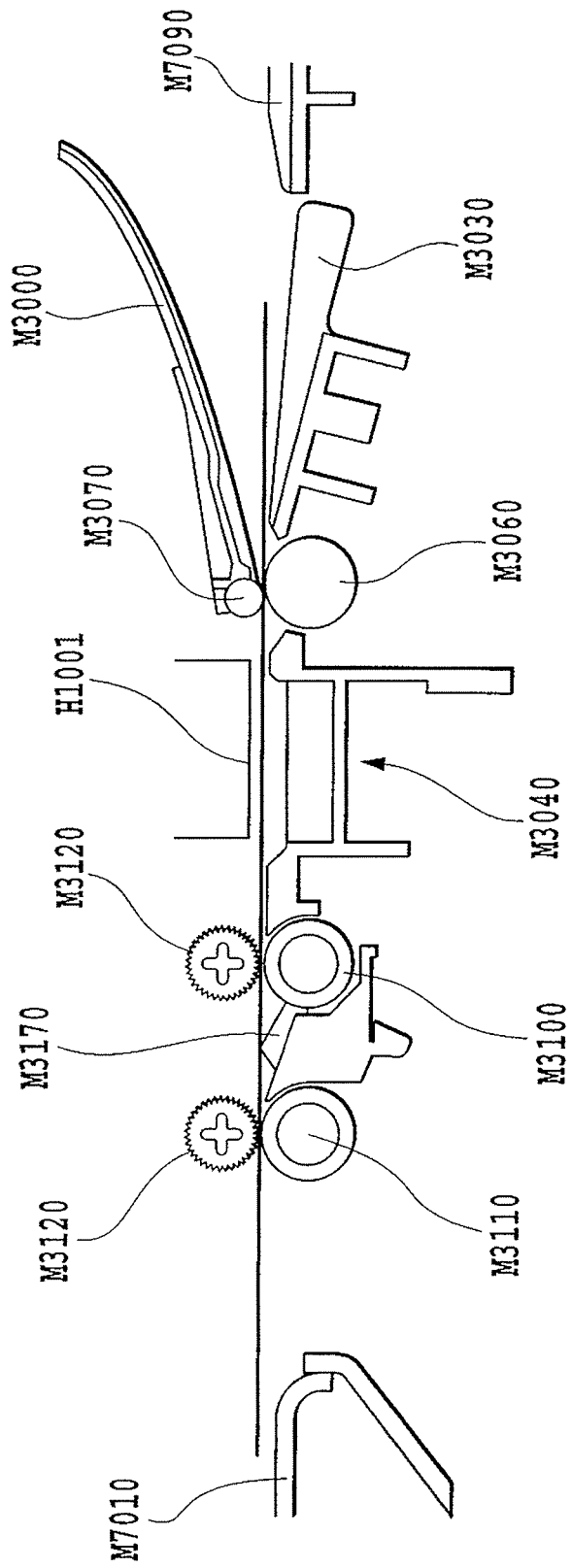
FIG. 14 is a schematic cross-sectional side view for explaining flat-pass printing performed in the embodiment.
Figure 15:
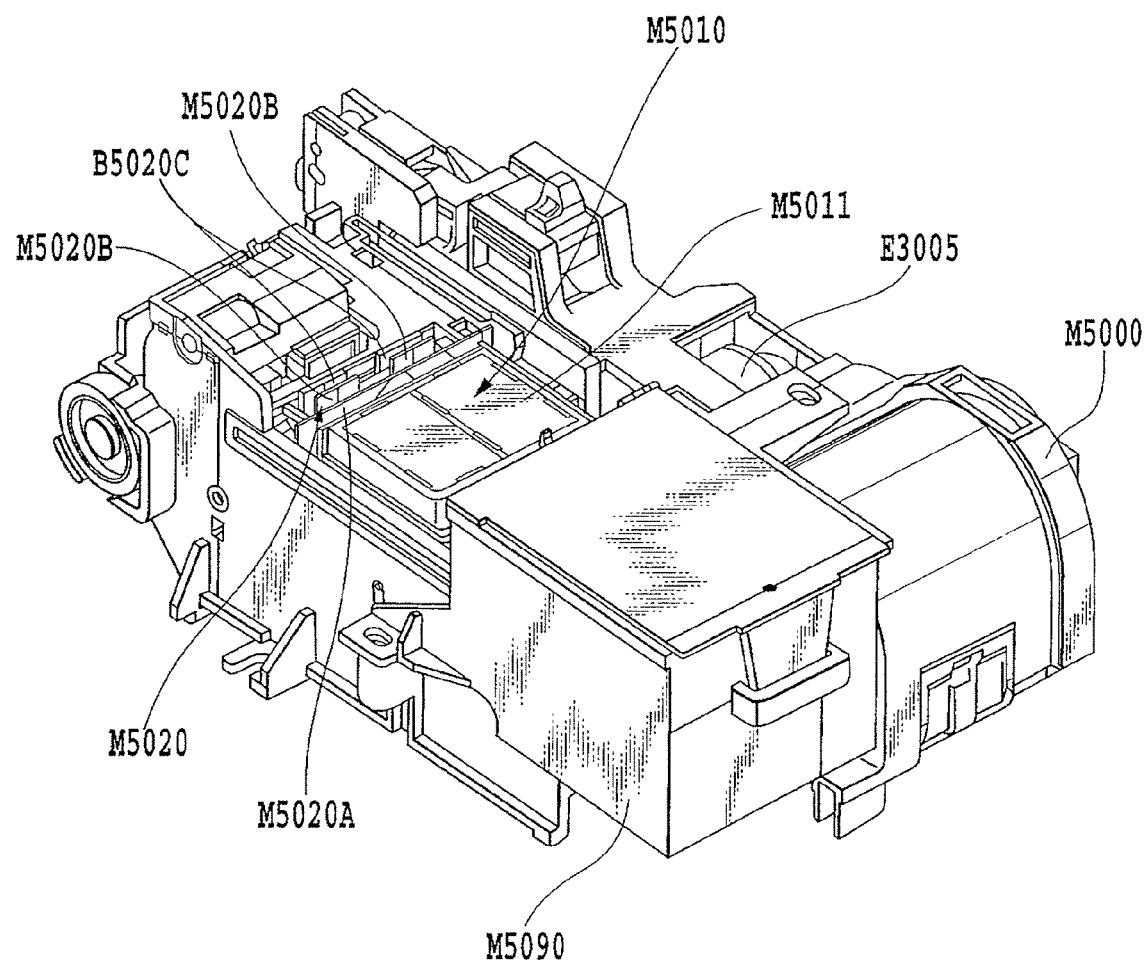
FIG. 15 is a perspective view showing a cleaning section of the printing apparatus body used in the embodiment.
Figure 16:
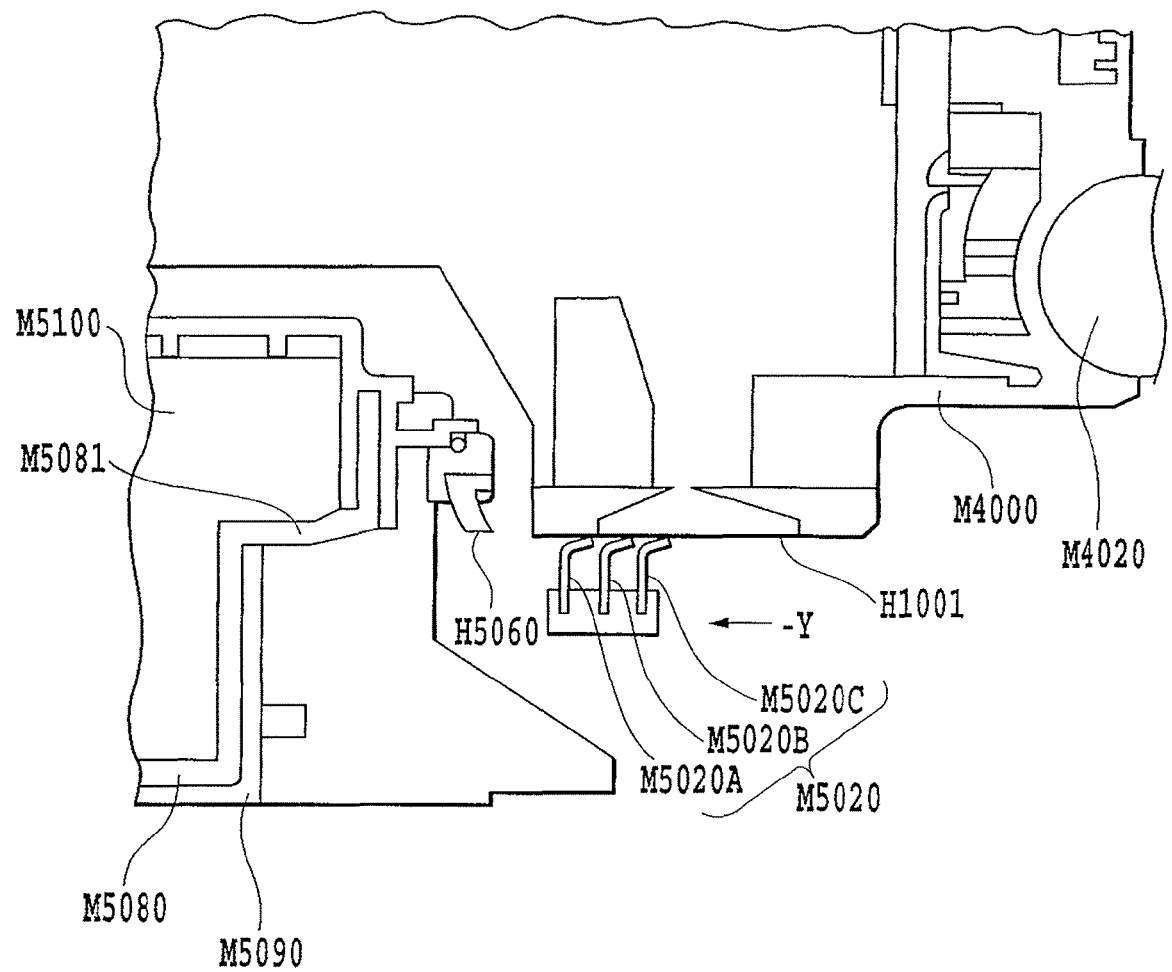
FIG. 16 is a cross-sectional view for explaining the constitution and operation of a wiper portion in the cleaning section of FIG. 15.
Figure 17:
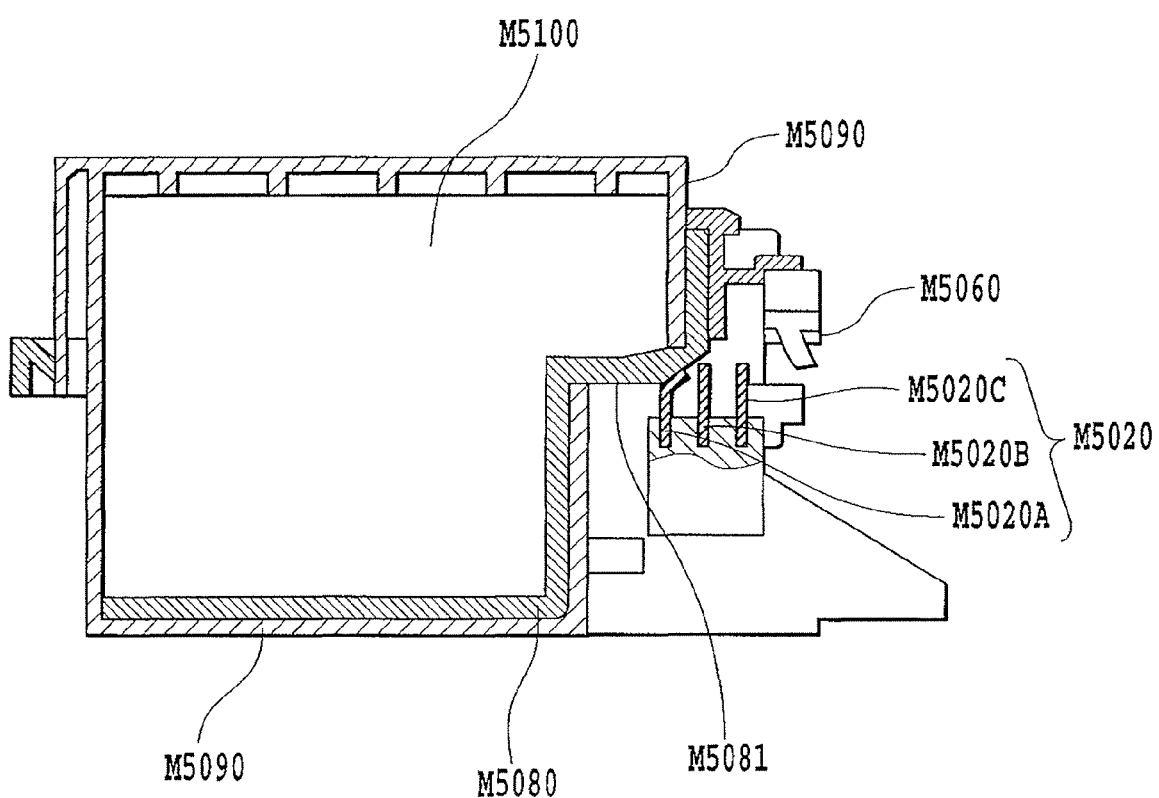
FIG. 17 is a cross-sectional view for explaining the constitution and operation of a wetting liquid transferring unit in the cleaning section of FIG. 15.

FIGS. 6, 7, 8, 12 and 13 are perspective views respectively showing appearances of the printing apparatus to which this embodiment is applied. FIG. 6 shows the printing apparatus in an unused condition when viewed from the front. FIG. 7 shows the printing apparatus in an unused condition when viewed from the back. FIG. 8 shows the printing apparatus in a used condition when viewed from the front. FIG. 12 shows the printing apparatus during flat-pass printing when viewed from the front. FIG. 13 shows the printing apparatus during flat-pass printing when viewed from the back. In addition, FIGS. 9 to 11 and 14 to 16 are diagrams for describing internal mechanisms in the main body of the printing apparatus. In this respect, FIG. 9 is a perspective view showing the printing apparatus when viewed from the right above. FIG. 10 is a perspective view showing the printing apparatus when viewed from the left above. FIG. 11 is a side, cross-sectional view of the main body of the printing apparatus. FIG. 14 is a cross-sectional view of the printing apparatus during flat-pass printing. FIG. 15 is a perspective view of the cleaning section. FIG. 16 is a cross-sectional view for describing a configuration and an operation of a wiping mechanism in the cleaning section. FIG. 17 is a cross-sectional view of a wetting liquid transferring unit in the cleaning section.

Descriptions will be provided for each of the sections by referring to these figures whenever deemed necessary.

(A) Outer Case (Refer to FIGS. 6 and 7)

The outer case is attached to the main body of the printing apparatus in order to cover the paper feeding section, the paper conveying section, the paper discharging section, the carriage section, the cleaning section, the flat-pass section and the wetting liquid transferring unit. The outer case is configured chiefly of a lower case M7080, an upper case M7040, an access cover M7030, a connector cover, and a front cover M7010.

Paper discharging tray rails (not illustrated) are provided under the lower case M7080, and thus the lower case M7080 has a configuration in which a divided paper discharging tray M3160 is capable of being contained therein. In addition, the front cover M7010 is configured to close the paper discharging port while the printing apparatus is not used.

An access cover M7030 is attached to the upper case M7040, and is configured to be turnable. A part of the top surface of the upper case has an opening portion. The printing apparatus has a configuration in which each of ink tanks H1900 or the printing head H1001 (refer to FIG. 21) is replaced with a new one in this position. Incidentally, in the printing apparatus of this embodiment, the printing head H1001 has a configuration in which a plurality of ejecting portions are formed integrally into one unit. The plurality of ejecting portions corresponding respectively to a plurality of mutually different colors, and each of the plurality of ejecting portions is capable of ejecting an ink of one color. In addition, the printing head is configured as a printing head cartridge H1000 which the ink tanks H1900 are capable of being attached to, and detached from, independently of one another depending on the respective colors. The upper case M7040 is provided with a door switch lever (not illustrated), LED guides M7060, a power supply key E0018, a resume key E0019, a flat-pass key E3004 and the like. The door switch lever detects whether the access cover M7030 is opened or closed. Each of the LED guides M7060 transmits, and displays, light from the respective LEDs. Furthermore, a multi-stage paper feeding tray M2060 is turnably attached to the upper case M7040. While the paper feeding section is not used, the paper feeding tray M2060 is contained within the upper case M7040. Thus, the upper case M7040 is configured to function as a cover for the paper feeding section.

The upper case M7040 and the lower case M7040 are attached to each other by elastic fitting claws. A part provided with a connector portion therebetween is covered with a connector cover (not illustrated).

(B) Paper Feeding Section (Refer to FIGS. 8 and 11)

As shown in FIGS. 8 and 11, the paper feeding section is configured as follows. A pressure plate M2010, a paper feeding roller M2080, a separation roller M2041, a return lever M2020 and the like are attached to a base M2000. The pressure plate M2010 is that on which printing media are stacked. The paper feeding roller M2080 feeds the printing media sheet by sheet. The separation roller M2041 separates a printing medium. The return lever M2020 is used for returning the printing medium to a stacking position.

(C) Paper Conveying Section (Refer to FIGS. 8 to 11)

A conveying roller M3060 for conveying a printing medium is rotatably attached to a chassis M1010 made of an upwardly bent plate. The conveying roller M3060 has a configuration in which the surface of a metal shaft is coated with ceramic fine particles. The conveying roller M3060 is attached to the chassis M1010 in a state in which metallic parts respectively of the two ends of the shaft are received by bearings (not illustrated). The conveying roller M3060 is provided with a roller tension spring (not illustrated). The roller tension spring pushes the conveying roller M3060, and thereby applies an appropriate amount of load to the conveying roller M3060 while the conveying roller M3060 is rotating. Accordingly, the conveying roller M3060 is capable of conveying printing medium stably.

The conveying roller M3060 is provided with a plurality of pinch rollers M3070 in a way that the plurality of pinch rollers M3070 abut on the conveying roller M3060. The plurality of pinch rollers M3070 are driven by the conveying roller M3060. The pinch rollers M3070 are held by a pinch roller holder M3000. The pinch rollers M3070 are pushed respectively by pinch roller springs (not illustrated), and thus are brought into contact with the conveying roller M3060 with the pressure. This generates a force for conveying printing medium. At this time, since the rotation shaft of the pinch roller holder M3000 is attached to the bearings of the chassis M1010, the rotation shaft rotates thereabout.

A paper guide flapper M3030 and a platen M3040 are disposed in an inlet to which a printing medium is conveyed. The paper guide flapper M3030 and the platen M3040 guide the printing medium. In addition, the pinch roller holder M3000 is provided with a PE sensor lever M3021. The PE sensor lever M3021 transmits a result of detecting the front end or the rear end of each of the printing medium to a paper end sensor (hereinafter referred to as a "PE sensor") E0007 fixed to the chassis M1010. The platen M3040 is attached to the chassis M1010, and is positioned thereto. The paper guide flapper M3030 is capable of rotating about a bearing unit (not illustrated), and is positioned to the chassis M1010 by abutting on the chassis M1010.

The printing head H1001 (refer to FIG. 21) is provided at a side downstream in a direction in which the conveying roller M3060 conveys the printing medium.

Descriptions will be provided for a process of conveying printing medium in the printing apparatus with the foregoing configuration. A printing medium sent to the paper conveying section is guided by the pinch roller holder M3000 and the paper guide flapper M3030, and thus is sent to a pair of rollers which are the conveying roller 3060 and the pinch roller M3070. At this time, the PE sensor lever M3021 detects an edge of the printing medium. Thereby, a position in which a print is made on the printing medium is obtained. The pair of rollers which are the conveying roller M3060 and the pinch roller M3070 are driven by an LF motor E0002, and are rotated. This rotation causes the printing medium to be conveyed over the platen M3040. A rib is formed in the platen M3040, and the rib serves as a conveyance datum surface. A gap between the printing head H1001 and the surface of the printing medium is controlled by this rib. Simultaneously, the rib also suppresses flapping of the printing medium in cooperation with the paper discharging section which will be described later.

A driving force with which the conveying roller M3060 rotates is obtained by transmitting a torque of the LF motor E0002 consisting, for example, of a DC motor to a pulley M3061 disposed on the shaft of the conveying roller M3060 through a timing belt (not illustrated). A code wheel M3062 for detecting an amount of conveyance performed by the conveying roller M3060 is provided on the shaft of the conveying roller M3060. In addition, an encode sensor M3090 for reading a marking formed in the code wheel M3062 is disposed in the chassis M1010 adjacent to the code wheel M3062. Incidentally, the marking formed in the code wheel M3062 is assumed to be formed at a pitch of 150 to 300 lpi (line/inch) (an example value).

(D) Paper Discharging Section (Refer to FIGS. 8 to 11)

The paper discharging section is configured of a first paper discharging roller M3100, a second paper discharging roller M3110, a plurality of spurs M3120 and a gear train.

The first paper discharging roller M3100 is configured of a plurality of rubber portions provided around the metal shaft thereof. The first paper discharging roller M3100 is driven by transmitting the driving force of the conveying roller M3060 to the first paper discharging roller M3100 through an idler gear.

The second paper discharging roller M3110 is configured of a plurality of elastic elements M3111, which are made of elastomer, attached to the resin-made shaft thereof. The second paper discharging roller M3110 is driven by transmitting the driving force of the first paper discharging roller M3100 to the second paper discharging roller M3110 through an idler gear.

Each of the spurs M3120 is formed by integrating a circular thin plate and a resin part into one unit. A plurality of convex portions are provided to the circumference of each of the spurs M3120. Each of the spurs M3120 is made, for example, of SUS. The plurality of spurs M3120 are attached to a spur holder M3130. This attachment is performed by use of a spur spring obtained by forming a coiled spring in the form of a stick. Simultaneously, a spring force of the spur spring causes the spurs M3120 to abut respectively on the paper discharging rollers M3100 and M3110 at predetermined pressures. This configuration enables the spurs 3120 to rotate to follow the two paper discharging rollers M3100 and M3110. Some of the spurs M3120 are provided at the same positions as corresponding ones of the rubber portions of the first paper discharging roller M3110 are disposed, or at the same positions as corresponding ones of the elastic elements M3111 are disposed. These spurs chiefly generates a force for conveying printing medium. In addition, others of the spurs M3120 are provided at positions where none of the rubber portions and the elastic elements M3111 is provided. These spurs M3120 chiefly suppresses lift of a printing medium while a print is being made on the printing medium.

Furthermore, the gear train transmits the driving force of the conveying roller M3060 to the paper discharging rollers M3100 and M3110.

With the foregoing configuration, a printing medium on which an image is formed is pinched with nips between the first paper discharging roller M3110 and the spurs M3120, and thus is conveyed. Accordingly, the printing medium is delivered to the paper discharging tray M3160. The paper discharging tray M3160 is divided into a plurality of parts, and has a configuration in which the paper discharging tray M3160 is capable of being contained under the lower case M7080 which will be described later. When used, the paper discharging tray M3160 is drawn out from under the lower case M7080. In addition, the paper discharging tray M3160 is designed to be elevated toward the front end thereof, and is also designed so that the two side ends thereof are held at a higher position. The design enhances the stackability of printing media, and prevents the printing surface of each of the printing media from being rubbed.

(E) Carriage Section (Refer to FIGS. 9 to 11)

The carriage section includes a carriage M4000 to which the printing head H1001 is attached. The carriage M4000 is supported with a guide shaft M4020 and a guide rail M1011.

The guide shaft M4020 is attached to the chassis M1010, and guides and supports the carriage M4000 so as to cause the carriage M4000 to perform reciprocating scan in a direction perpendicular to a direction in which a printing medium is conveyed. The guide rail M1011 is formed in a way that the guide rail M1011 and the chassis M1010 are integrated into one unit. The guide rail M1011 holds the rear end of the carriage M4000, and thus maintains the space between the printing head H1001 and the printing medium. A slide sheet M4030 formed of a thin plate made of stainless steel or the like is stretched on a side of the guide rail M1011, on which side the carriage M4000 slides. This makes it possible to reduce sliding noises of the printing apparatus.

The carriage M4000 is driven by a carriage motor E0001 through a timing belt M4041. The carriage motor E0001 is attached to the chassis M1010. In addition, the timing belt M4041 is stretched and supported by an idle pulley M4042. Furthermore, the timing belt M4041 is connected to the carriage M4000 through a carriage damper made of rubber. Thus, image unevenness is reduced by damping the vibration of the carriage motor E0001 and the like.

An encoder scale E0005 for detecting the position of the carriage M4000 is provided in parallel with the timing belt M4041 (the encoder scale E0005 will be described later by referring to FIG. 18). Markings are formed on the encoder scale E0005 at pitches in a range of 150 lpi to 300 lpi. An encoder sensor E0004 for reading the markings is provided on a carriage board E0013 installed in the carriage M4000 (the encoder sensor E0004 and the carriage board E0013 will be described later by referring to FIG. 18). A head contact E0101 for electrically connecting the carriage board E0013 to the printing head H1001 is also provided to the carriage board E0013. Moreover, a flexible cable E0012 (not illustrated) is connected to the carriage M4000 (the flexible cable E0012 will be described later by referring to FIG. 18). The flexible cable E0012 is that through which a drive signal is transmitted from an electric substrate E0014 to the printing head H1001.

As for components for fixing the printing head H1001 to the carriage M4000, the following components are provided to the carriage M4000. An abutting part (not illustrated) and pressing means (not illustrated) are provided on the carriage M4000. The abutting part is with which the printing head H1001 positioned to the carriage M4000 while pushing the printing head H1001 against the carriage M4000. The pressing means is with which the printing head H1001 is fixed at a predetermined position. The pressing means is mounted on a headset lever M4010. The pressing means is configured to act on the printing head H1001 when the headset lever M4010 is turned about the rotation support thereof in a case where the printing head H1001 is intended to be set up.

Moreover, a position detection sensor M4090 including a reflection-type optical sensor is attached to the carriage M4000. The position detection sensor is used while a print is being made on a special medium such as a CD-R, or when a print result or the position of an edge of a sheet of paper is being detected. The position detection sensor M4090 is capable of detecting the current position of the carriage M4000 by causing a light emitting device to emit light and by thus receiving the emitted light after reflecting off the carriage M4000.

In a case where an image is formed on a printing medium in the printing apparatus, the set of the conveying roller M3060 and the pinch rollers M3070 transfers the printing medium, and thereby the printing medium is positioned in terms of a position in a column direction. In terms of a position in a row direction, by using the carriage motor E0001 to move the carriage M4000 in a direction perpendicular to the direction in which the printing medium is conveyed, the printing head H1001 is located at a target position where an image is formed. The printing head H1001 thus positioned ejects inks onto the printing medium in accordance with a signal transmitted from the electric substrate E0014. Descriptions will be provided later for details of the configuration of the printing head H1001 and a printing system. The printing apparatus of this embodiment alternately repeats a printing main scan and a sub-scan. During the printing main scan, the carriage M4000 scans in the row direction while the printing head H1001 is making a print. During the sub-scan, the printing medium is conveyed in the column direction by conveying roller M3060. Thereby, the printing apparatus is configured to form an image on the printing medium.

(F) Flat-pass Printing Section (Refer to FIGS. 12 to 14)

A printing medium is fed from the paper feed section in a state where the printing medium is bent, because the passage through which the printing medium passes continues curving up to the pinch rollers as shown in FIG. 11. For this reason, if a thicker printing medium with a thickness of approximately 0.5 mm or more, for example, is attempted to be fed from the paper feeding section, a reaction force of the bent printing medium occurs, and thus resistance to the paper feeding increases. As a result, it is likely that the printing medium cannot be fed. Otherwise, even if the printing medium can be fed, the delivered printing medium remains bent, or is folded.

A flat-pass print is made on printing media, such as thicker printing media, which a user does not wish to fold, and on printing media, such as CD-Rs, which cannot be bent.

Types of flat-pass prints include a type of print made by manually supplying a printing medium from a slit-shaped opening portion (under a paper feeding unit) in the back of the main body of a printing apparatus, and by thus causing pinch rollers of the main body to nip the printing medium. However, the flat-pass print of this embodiment employs the following mode. A printing medium is fed from the paper discharging port located in the front side of the main body of the printing apparatus to a position where a print is going to be made, and the print is made on the printing medium by switching back the printing medium.

The front cover M7010 is usually located below the paper discharging section, because the front cover M7010 is also used as a tray in which several tens of printing media on which prints have been made are stacked (refer to FIG. 8). When a flat-pass print is going to be made, the front tray M7010 is elevated up to a position where the paper discharging port is located (refer to FIG. 12) for the purpose of supplying a printing medium from the paper discharging port horizontally in a direction reverse to the direction in which a printing medium is usually conveyed. Hooks and the like (not illustrated) are provided to the front cover M7010. Thus, the front cover M7010 is capable of being fixed to a position where the printing medium is supplied for the purpose of the flat-pass print. It can be detected by a sensor whether or not the front cover M7010 is located at the position where the printing medium is supplied for the purpose of the flat-pass print. Depending on this detection, it can be determined whether the printing apparatus is in a flat-pass printing mode.

In the case of the flat-pass printing mode, first of all, a flat-pass key E3004 is operated for the purpose of placing a printing medium on the front tray M7010 and inserting the printing medium from the paper discharging port. Thereby, a mechanism (not illustrated) lifts the spur holder M3130 and the pinch roller holder M3000 respectively up to positions higher than a presumed thickness of the printing medium. In addition, in a case where the carriage M4000 exists in an area through which the printing medium is going to pass, a lifting mechanism (not illustrated) lifts the carriage M4000 up. This makes it easy to insert the printing medium therein. Moreover, by pressing a rear tray button M7110, a rear tray M7090 can be opened. Furthermore, a rear sub-tray M7091 can be opened in the form of the letter V (refer to FIG. 13). The rear tray M7090 and the rear sub-tray M7091 are trays with which a long printing medium is supported in the back of the main body of the printing apparatus. This is because, if the long printing medium is inserted from the front of the main body of the printing apparatus, the long printing medium juts out of the back of the main body of the printing apparatus. If a thicker printing medium is not kept flat while a print is being made on the thicker printing medium, the thicker printing medium may be rubbed against the head ejection face, or the conveyance load may change. This is likely to adversely affect the print quality. For this reason, the disposition of these trays is effective. However, if a printing medium is not long enough to jut out of the back of the main body of the printing apparatus, the rear tray M7090 and the like need not be opened.

In the foregoing manner, a printing medium can be inserted from the paper discharging port to the inside of the main body of the printing apparatus. A printing medium is positioned on the front tray M7010 by aligning the rear edge (an edge at the side located closest to a user) and the right edge of the printing medium to a position in the front tray M7010 where a marker is formed.

At this time, if the flat-pass key E3004 is operated once again, the spur holder M3130 comes down, and thus the paper discharging rollers M3100, M3110 and the spurs M3120 jointly nip the printing medium. Thereafter, the paper discharging rollers M3100 and M3110 draw the printing medium into the main body of the printing apparatus by a predetermined amount thereof (in a direction reverse to the direction in which the printing medium is conveyed during normal printing). Because the edge at the side closest to the user (the rear edge) of a printing medium is aligned to the marker when the printing medium is set up at the beginning, it is likely that the front edge (the edge located farthest from a user) of the printing medium may not reach the conveying roller M3060, if the printing medium is shorter. With this taken into consideration, the predetermined amount is defined as a distance between the rear edge of a printing medium with the presumably shortest length and the conveying roller M3060. Once a printing medium is transferred by the predetermined amount, the rear edge of the printing medium reaches the conveying roller M3060. Thus, the pinch roller holder M3000 is lowered at the position, and the conveying roller M3060 and the pinch rollers M3070 are caused to nip the printing medium. Subsequently, the printing medium is further transferred so that the rear edge of the printing medium is nipped by the conveying roller M3060 and the pinch rollers M3070. Thereby, the supplying of the printing medium for the purpose of the flat-pass print is completed (at a position where the printing medium waits for a print to be made thereon).

A nip force with which the paper discharging roller M3100 and M3110 as well as the spurs M3120 nip a printing medium is set relatively weak lest the force should adversely affect image formation while the printing medium is being delivered during a normal print. For this reason, in the case where a flat-pass print is going to be made, it is likely that the position of the printing medium shifts before the print starts. In this embodiment, however, a printing medium is nipped by the conveying roller M3060 and the pinch rollers M3070 which have a relatively stronger nip force. This secures a position where a printing medium should be set. In addition, while a printing medium is being conveyed into the inside of the main body by the predetermined amount, a flat-pass paper detection sensor lever (hereinafter referred to as an "FPPE sensor lever") M3170 blocks or forms a light path of an FPPE sensor E9001 which is an infrared-ray sensor, and which is not illustrated here. Thereby, the position of the rear edge (the position of the front edge during the print) of the printing medium can be detected. Incidentally, the FPPE sensor lever may be rotatably provided between the platen M3040 and the spur holder M3130.

Once a printing medium is set at the position where the printing medium waits for a print to be made thereon, a print command is executed. Specifically, the conveying roller M3060 conveys the printing medium to a position where the printing head H1001 is going to make a print on the printing medium. Thereafter, the print is made in the same manner as a normal printing operation is performed. After the print, the printing medium is discharged to the front tray M7010.

In a case where the flat-pass print is intended to be made successively, the printing medium on which the print has been made is removed from the front tray M7010, and the next printing medium is set thereon. After that, it is sufficient that the foregoing processes are repeated. Specifically, the subsequent print starts with the setting of a printing medium after the spur holder M3130 and the pinch roller holder M3000 are lifted up by pressing the flat-pass key E3004.

On the other hand, in a case where the flat-pass print is intended to be completed, the printing apparatus is returned to the normal printing mode by returning the front tray M7010 to the normal print position.

(G) Cleaning Section (Refer to FIGS. 15 and 16)

The cleaning section is a mechanism for cleaning the printing head H1001. The cleaning section is configured of a pump M5000, caps M5010, a wiper portion M5020 and the like. The caps M5010 are those which prevent the printing head H1001 from being dried out. The wiper portion M5020 is used for cleaning the surface of the printing head H1001 on which the ejection openings are formed.

Figure 18:
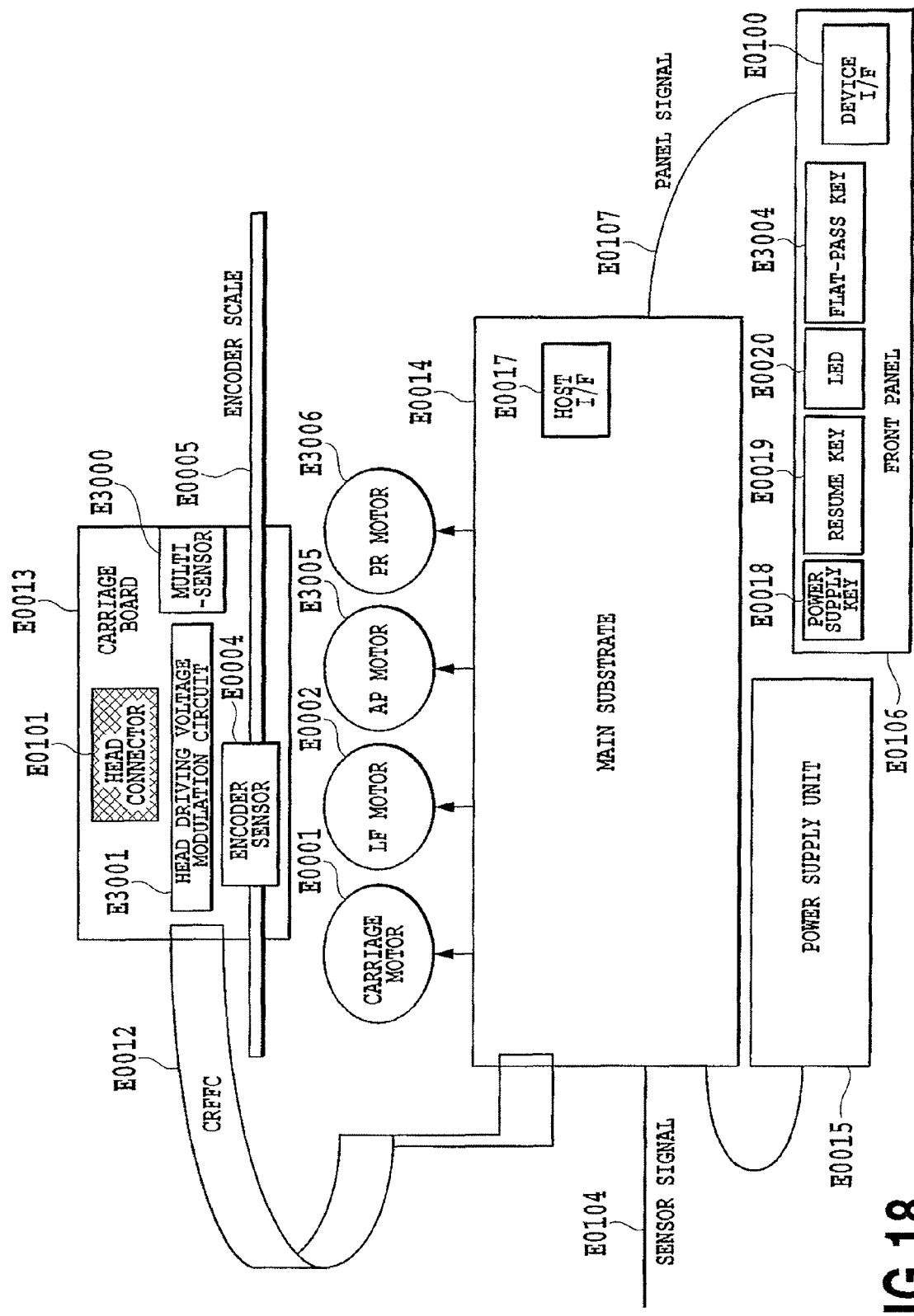
FIG. 18 is a block diagram schematically showing the overall configuration of an electric circuit in the embodiment of the present invention.

In the case of this embodiment, a chief driving force of the cleaning section is transmitted from an AP motor E3005 (see FIG. 18). The pump M5000 is designed to be operated by rotation in one direction which is generated by means of a one-way clutch (not illustrated). The wiper portion M5020 and the caps M5010 are designed to ascend and descend by rotation in the other direction which is generated by the one-way clutch Incidentally, the AP motor E3005 is also used as a driving power supply for an operation of feeding printing medium, but a motor specialized for operating the cleaning section may be provided to the cleaning section instead.

The motor E0003 drives the caps M5010 so as for the caps M5010 to be capable of ascending and descending by means of an ascending/descending mechanism (not illustrated) When the caps M5010 go up to an ascending position, the caps M5010 cap each of the ejection faces of several ejecting portions provided to the printing head H1001. While no print operation is being performed, the caps M5010 can protect the printing head H1001. Otherwise, the caps M5010 can recover the printing head H1001 by suction. While a print operation is being performed, the caps M5010 can be placed in a descending position which prevents the caps M5010 from interfering with the printing head H1001. In addition, by opposing the caps M5010 to the ejection face, the caps M5010 are capable of receiving preliminary ejections. In a case where, for instance, the printing head H1001 is provided with ten ejecting portions, two caps M5010 are provided to the cleaning section in the illustrated example so that the ejection face corresponding to each five ejecting portions can be capped collectively by corresponding one of the two caps M5010.

A wiper portion M5020 made of an elastic member such as rubber is fixed to a wiper holder (not illustrated). The wiper holder is capable of moving in directions indicated by −Y and +Y in FIG. 16 (−Y and +Y are directions in which the ejection openings in the ejecting portions are arranged). When the printing head H1001 gets to the home position, the wiper holder moves in the direction indicated by an arrow −Y. Thereby, a surface of the printing head H1001 can be wiped. Once the wiping operation is completed, the carriage is caused to escape out of the range where the wiping operation is designed to be performed, and thus the wiper is returned to a position which prevents the wiper from interfering with the ejection face and the like. Incidentally, the wiper portion M5020 of this example is provided with a wiper blade M5020A for wiping the entire surface of the printing head H1001 including all of the ejection faces of the ejecting portions. In addition, the wiper portion M5020 is provided with the other two wiper blades M5020B and M5020C. The wiper blade M5020B wipes vicinities of nozzles for ejection faces of five of the ten ejecting portions, whereas the wiper blade M5020C wipes vicinities of nozzles for ejection faces of the other five of the ten ejecting portions.

After wiping, the wiper portion M5020 abuts on a blade cleaner M5060. Thereby, the wiper blades M5020A to M5020C are configured to be cleaned of inks and the like which have been adhered to themselves. In addition, the wiper portion M5020 has the following configuration (a wetting liquid transferring unit). A wetting liquid is transferred onto the wiper blades M5020A to M5020C before wiping. This enhances cleaning performance of the wiping operation. Descriptions will be provided later for a configuration of this wetting liquid transferring unit and the wiping operation.

The suction pump M5000 is capable of generating negative pressure in a state where an airtight space is formed inside the cap M5010 by connecting the cap M5010 to the ejection faces. Thereby, inks can be filled in the ejecting portions from the ink tanks H1900. In addition, dust, adhering matter, bubbles and the like which exist in the ejection openings and the internal ink passage leading to the ejection openings can be removed by suction.

What is used for the suction pump M5000 is, for example, a tube pump. This includes a member having a curved surface which is formed by squeezing and holding at least part of a flexible tube; a roller being capable of pressing the flexible tube towards the member; and a roller supporting part which supports the roller, and which is capable of rotating. Specifically, the roller supporting part is rotated in a predetermined direction, and thereby the roller is rolled on the member in which the curved surface has been formed, while pressing the flexible tube. In response to this, the negative pressure is generated in the airtight space formed by the cap M5010. This negative pressure sucks inks from the ejection openings, and subsequently sucks up the inks into the tube or the suction pump from the cap M5010. Thereafter, the sucked inks are further transferred to a suitable member (a waste ink absorbing member) provided inside the lower case M7080.

Note that an absorbing member M5011 is provided to the inside portion of the cap M5010 for the purpose of reducing the amount of inks remaining on the ejection faces of the printing head H1001 after the suction. In addition, consideration is made for sucking inks, which remain in the cap M5010 and the absorbing member M5011, in a state where the cap M5010 is opened, and for thus precluding the ink residue from coagulating and for accordingly preventing an adverse affect from occurring subsequently by sucking. It is desirable that no abrupt negative pressure should work on the ejection faces by providing an open-to-atmosphere valve (not illustrated) in a middle of the ink suction passage, and by thus beforehand opening the valve when the cap M5010 is intended to be detached from the ejection faces.

Furthermore, the suction pump M5000 can be operated not only for the purpose of the recovery by suction, but also for the purpose of discharging inks which have been received by the cap M5010 by the preliminary ejection operation performed in the state where the cap M5010 is opposite to the ejection faces. Specifically, when an amount of inks held in the cap M5010 after preliminary ejection reaches a predetermined amount, the inks held in the cap M5010 can be transferred to the waste ink absorbing member through the tube by operating the suction pump M5000.

The series of operations performed successively, such as the operations of the wiper portion M5020, the ascent/descent of the cap M5010 and the opening/closing of the valve, can be controlled by means of a main cam (not illustrated) provided on the output axle of the motor E0003, and a plurality of cams and arms and like which move so as to follow the main cam. Specifically, rotation of the main cam in response to a direction in which the motor E0003 rotates operates cams, arms and the like in each of the units and parts. Thereby, the predetermined operations can be performed. The position of the main cam can be detected with a position detection sensor such as a photo-interrupter.

(H) Wetting Liquid Transferring Unit (Refer to FIGS. 16 and 17)

Recently, inks containing pigment components as coloring agents (pigmented inks) are increasingly used for the purpose of enhancing the printing density, water resistance, light resistance of printed materials. Pigmented inks are produced through dispersing coloring agents themselves, which are originally solids, into water by adding dispersants thereto, or by introducing functional groups to pigment surfaces. Consequently, dried matter of pigmented inks resulting from drying the inks through evaporating moisture from the inks on the ejection faces damages the ejection faces more than dried coagulated matter of dyed inks in which the coloring agents are dissolved at molecular level. In addition, polymer compounds used for dispersing the pigments into the solvent are apt to be adsorbed to the ejection faces. This type of problem occurs in matter other than pigmented inks in a case where polymer compounds exist in the inks as a result of adding reactive liquids to the inks for the purpose of administering the viscosities of the inks, for the purpose of enhancing the light resistance of the inks, or for other purposes.

In this embodiment, a liquid is transferred onto, and adhered to, the blades of the wiper portion M5020, and thus the wiping operation is performed with the wetted blades M5020, in order to solve the foregoing problem. Thereby, the present embodiment attempts at preventing the ejection faces from deteriorating due to the pigmented inks, at reducing the abrasion of the wiper, and at removing the accumulated matter by dissolving the ink residue accumulated on the ejection faces. Such a liquid is termed as the wetting liquid from the viewpoint of its function in the description. The wiping by use of this liquid is termed as the wet wiping.

This embodiment adopts a configuration in which the wetting liquid is stored inside the main body of the printing apparatus. Reference numeral M5090 denotes a wetting liquid tank. As the wetting liquid, a glycerin solution or the like is contained in the wetting liquid tank M5090. Reference numeral M5100 denotes a wetting liquid holding member, which is fibrous member or the like. The wetting liquid holding member M5100 has an adequate surface tension for the purpose of preventing the wetting liquid from leaking from the wetting liquid tank M5090. The wetting liquid holding member M5100 is impregnated with, and holds, the wetting liquid. Reference numeral M5080 denotes a wetting liquid transferring member, which is made, for example, of a porous material having an adequate capillary force. The wetting liquid transferring member M5080 includes a wetting liquid transferring part M5081 which is in contact with the wiper blade. The wetting liquid transferring member M5080 is also in contact with the wetting liquid holding member M5100 infiltrated with the wetting liquid. As a result, the wetting liquid transferring member M5080 is also infiltrated with the wetting liquid. The wetting liquid transferring member M5080 is made of the material having the capillary force which enables the wetting liquid to be supplied to the wetting liquid transferring part M5081 even if a smaller amount of wetting liquid remains Descriptions will be provided for operations of the wetting liquid transferring unit and the wiper portion.

First of all, the cap M5010 is set at the descending position, and thus is escaped to a position where the carriage M4000 does not contact the blades M5020A to M5020C, In this state, the wiper portion M5020 is moved in the −Y direction, and is caused to pass through the part of the blade cleaner M5060. Accordingly, the wiper portion M5020 is caused to abut on the wetting liquid transferring part M5081 (refer to FIG. 17). By keeping the wiper portion M5020 in contact with the wetting liquid transferring part M5081 for an adequate length of time, an adequate amount of wetting liquid is transferred onto the wiper portion M5020.

Subsequently, the wiper portion M5020 is moved in the +Y direction. The blade contacts the blade cleaner M5060 only in a part of the surface of the blade cleaner M5060, and no wetting liquid is adhered to the part. For this reason, the wetting liquid remains to be held on the blade.

The blade is returned to the position where the wiping operation has been started. Thereafter, the carriage M4000 is moved to the position where the wiping operation is designed to be performed. Subsequently, the wiper portion M5020 is moved in the −Y direction. Thereby, the ejection faces of the printing head H1001 can be wiped with the surface to which the wetting liquid is adhered.

1.3 Configuration of Electrical Circuit

Descriptions will be provided next for a configuration of an electrical circuit of this embodiment.

FIG. 18 is a block diagram for schematically describing the entire configuration of the electrical circuit in the printing apparatus J0013. The printing apparatus to which this embodiment is applied is configured chiefly of the carriage board E0013, the main substrate E0014, a power supply unit E0015, a front panel E0106 and the like.

The power supply unit E0015 is connected to the main substrate E0014, and thus supplies various types of drive power.

The carriage board E0013 is a printed circuit board unit mounted on the carriage M4000. The carriage board E0013 functions as an interface for transmitting signals to, and receiving signals from, the printing head H1001 and for supplying head driving power through the head connector E0101. The carriage board E0013 includes a head driving voltage modulation circuit E3001 with a plurality of channels to the respective ejecting portions of the printing head H1001. The plurality of ejecting portions corresponding respectively to the plurality of mutually different colors. In addition, the head driving voltage modulation circuit E3001 generates head driving power supply voltages in accordance with conditions specified by the main substrate E0014 through the flexible flat cable (CRFFC) E0012. In addition, change in a positional relationship between the encoder scale E0005 and the encoder sensor E0004 is detected on the basis of a pulse signal outputted from the encoder sensor E0004 in conjunction with the movement of the carriage M4000. Moreover, the outputted signal is supplied to the main substrate E0014 through the flexible flat cable (CRFFC) E0012.

Figure 20:
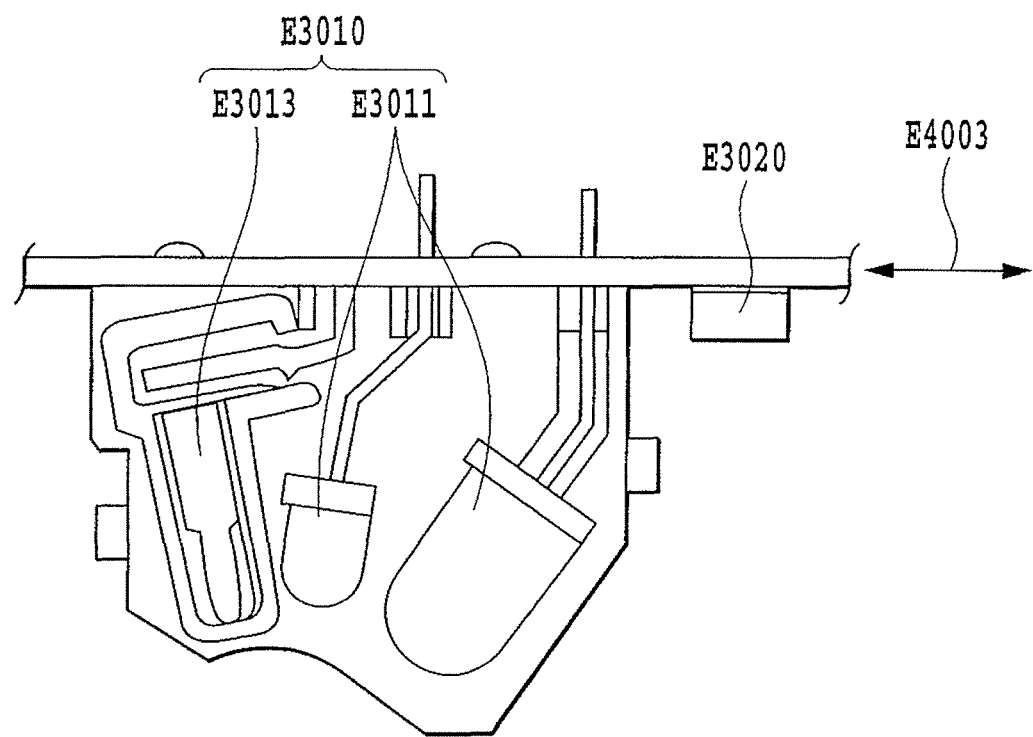
FIG. 20 is a view showing an example of the configuration of a multisensor mounted on a carriage substrate in FIG. 18.

An optical sensor E3010 and a thermistor E3020 are connected to the carriage board E0013, as shown in FIG. 20. The optical sensor E3010 is configured of two light emitting devices (LEDs) E3011 and a light receiving element E3013. The thermistor E3020 is that with which an ambient temperature is detected. Hereinafter, these sensors are referred to as a multisensor system E3000. Information obtained by the multisensor system E3000 is outputted to the main substrate E00014 through the flexible flat cable (CRFFC) E0012.

The main substrate E0014 is a printed circuit board unit which drives and controls each of the sections of the ink jet printing apparatus of this embodiment. The main substrate E0014 includes a host interface (host I/F) E0017 thereon. The main substrate E0014 controls print operations on the basis of data received from the host apparatus J0012 (FIG. 1). The main substrate E0014 is connected to and controls various types of motors including the carriage motor E0001, the LF motor E0002, the AP motor E3005 and the PR motor E3006. The carriage motor E0001 is a motor serving as a driving power supply for causing the carriage M4000 to perform main scan. The LF motor E0002 is a motor serving as a driving power supply for conveying printing medium. The AP motor E3005 is a motor serving as a driving power supply for causing the printing head H1001 to perform recovery operations. The PR motor E3006 is a motor serving as a driving power supply for performing a flat-pass print operation; and the main substrate E0014 thus controls drive of each of the functions. Moreover, the main substrate E0014 is connected to sensor signals E0104 which are used for transmitting control signals to, and receiving detection signals from, the various sensors such as a PF sensor, a CR lift sensor, an LF encoder sensor, and a PG sensor for detecting operating conditions of each of the sections in the printer. The main substrate E0014 is connected to the CRFFC E0012 and the power supply unit E0015. Furthermore, the main substrate E0014 includes an interface for transmitting information to, and receiving information from a front panel E0106 through panel signals E0107.

The front panel E0106 is a unit provided to the front of the main body of the printing apparatus for the sake of convenience of user's operations. The front panel E0106 includes the resume key E0019, the LED guides M7060, the power supply key E0018, and the flat-pass key E3004 (refer to FIG. 6) The front panel E0106 further includes a device I/F E0100 which is used for connecting peripheral devices, such as a digital camera, to the printing apparatus.

Figure 19:
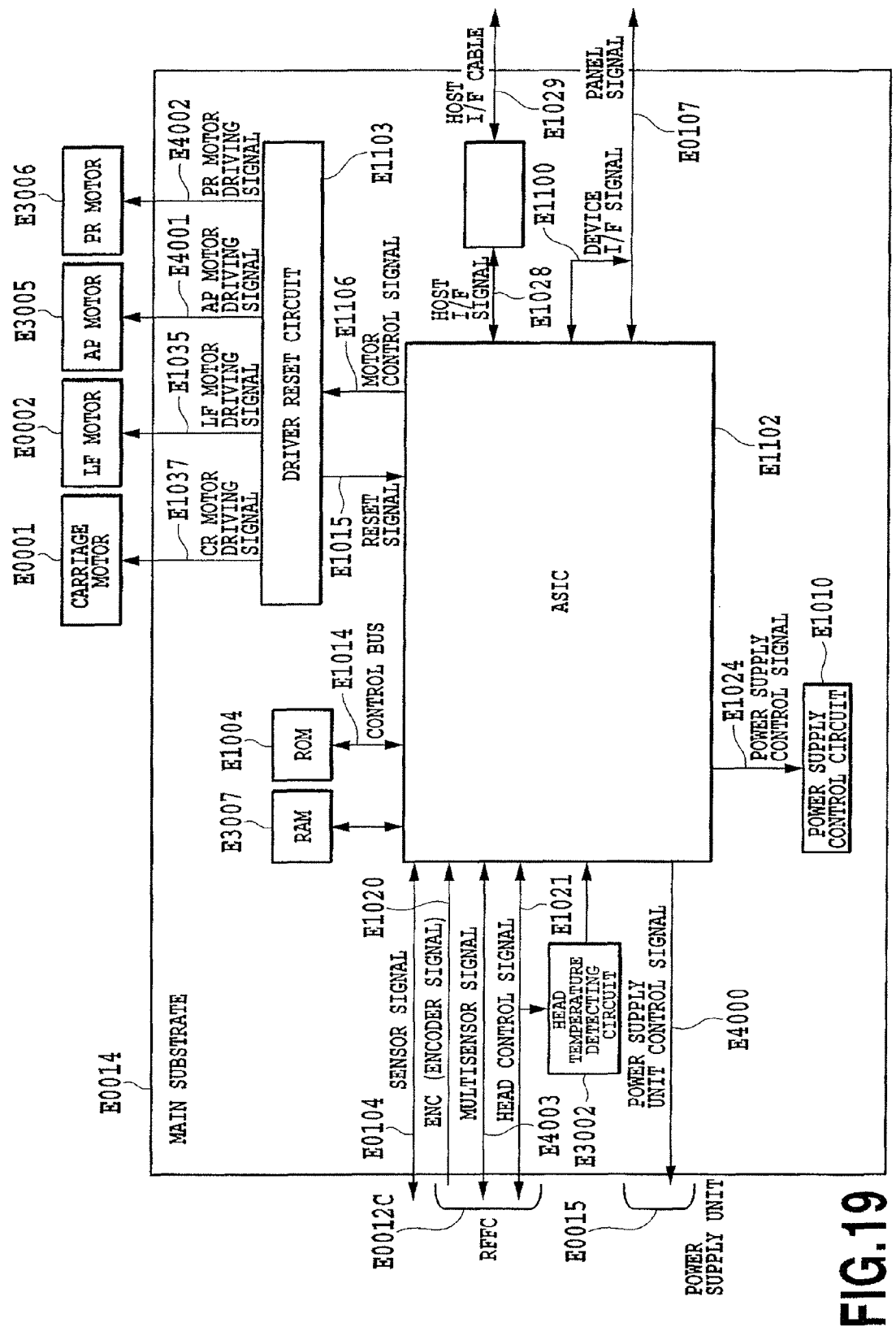
FIG. 19 is a block diagram showing an example of an internal configuration of a main substrate in FIG. 18.

FIG. 19 is a block diagram showing an internal configuration of the main substrate E1004.

In FIG. 19, reference numeral E1102 denotes an ASIC (Application Specific Integrated Circuit). The ASIC E1102 is connected to a ROM E1004 through a control bus E1014, and thus performs various controls in accordance with programs stored in the ROM E1004. For example, the ASIC E1102 transmits sensor signals E0104 concerning the various sensors and multisensor signals E4003 concerning the multisensor system E3000. In addition, the ASIC E1102 receives sensor signals E0104 concerning the various sensors and multisensor signals E4003 concerning the multisensor system. Furthermore, the ASIC E1102 detects encoder signals E1020 as well as conditions of outputs from the power supply key E0018, the resume key E0019 and the flat-pass key E3004 on the front panel E0106. In addition, the ASIC E1102 performs various logical operations, and makes decisions on the basis of conditions, depending on conditions in which the host I/F E0017 and the device I/F E0100 on the front panel are connected to the ASIC E1102, and on conditions in which data are inputted. Thus, the ASIC E1102 controls the various components, and accordingly drives and controls the ink jet printing apparatus.

Reference E1103 denotes a driver reset circuit. In accordance with motor controlling signals E1106 from the ASIC E1102, the driver reset circuit E1103 generates CR motor driving signals E1037, LF motor driving signals E1035, AP motor driving signals E4001 and PR motor driving signals 4002, and thus drives the motors. In addition, the driver reset circuit E1103 includes a power supply circuit, and thus supplies necessary power to each of the main substrate E0014, the carriage board E0013, the front panel E0106 and the like. Moreover, once the driver reset circuit E1103 detects drop of the power supply voltage, the driver reset circuit E1103 generates reset signals E1015, and thus performs initialization.

Reference numeral E1010 denotes a power supply control circuit. In accordance with power supply controlling signals E1024 outputted from the ASIC E1102, the power supply control circuit E1010 controls the supply of power to each of the sensors which include light emitting devices.

The host I/F E0017 transmits host I/F signals E1028, which are outputted from the ASIC E1102, to a host I/F cable E1029 connected to the outside. In addition, the host I/F E0017 transmits signals, which come in through this cable E1029, to the ASIC E1102.

Meanwhile, the power supply unit E0015 supplies power. The supplied power is supplied to each of the components inside and outside the main substrate E0014 after voltage conversion depending on the necessity. Furthermore, power supply unit controlling signals E4000 outputted from the ASIC E1102 are connected to the power supply unit E0015, and thus a lower power consumption mode or the like of the main body of the printing apparatus is controlled.

The ASIC E1102 is a single-chip semiconductor integrated circuit incorporating an arithmetic processing unit. The ASIC E1102 outputs the motor controlling signals E1106, the power supply controlling signals E1024, the power supply unit controlling signals E4000 and the like. In addition, the ASIC E1102 transmits signals to, and receives signals from, the host I/F E0017. Furthermore, the ASIC E1102 transmits signals to, and receives signals from, the device I/F E0100 on the front panel by use of the panel signals E0107. As well, the ASIC E1102 detects conditions by means of the sensors such as the PE sensor and an ASF sensor with the sensor signals E0104. Moreover, the ASIC E1102 controls the multisensor system E3000 with the multisensor signals E4003, and thus detects conditions. In addition, the ASIC E1102 detects conditions of the panels signals E0107, and thus controls the drive of the panel signals E0107. Accordingly, the ASIC E1102 turns on/off the LEDs E0020 on the front panel.

The ASIC E1102 detects conditions of the encoder signals (ENC) E1020, and thus generates timing signals. The ASIC E1102 interfaces with the printing head H1001 with head controlling signals E1021, and thus controls print operations. In this respect, the encoder signals (ENC) E1020 are signals which are receives from the CRFFC E0012, and which have been outputted from the encoder sensor E0004. In addition, the head controlling signals E1021 are connected to the carriage board E0013 through the flexible flat cable E0012. Subsequently, the head controlling signals E1021 are supplied to the printing head H1001 through the head driving voltage modulation circuit E3001 and the head connector E0101. Various types of information from the printing head H1001 are transmitted to the ASIC E1102. Signals representing information on head temperature of each of the ejecting portions among the types of information are amplified by a head temperature detecting circuit E3002 on the main substrate, and thereafter the signals are inputted into the ASIC E1102. Thus, the signals are used for various decisions on controls.

In the figure, reference numeral E3007 denotes a DRAM. The DRAM E3007 is used as a data buffer for a print, a buffer for data received from the host computer, and the like. In addition, the DRAM is used as work areas needed for various control operations.

1.4 Configuration of Printing Head

Descriptions will be provided below for a configuration of the head cartridge H1000 to which this embodiment is applied.

The head cartridge H1000 in this embodiment includes the printing head H1001, means for mounting the ink tanks H1900 on the printing head H1001, and means for supplying inks from the respective ink tanks H1900 to the printing head H1001. The head cartridge H1000 is detachably mounted on the carriage M4000.

Figure 21:
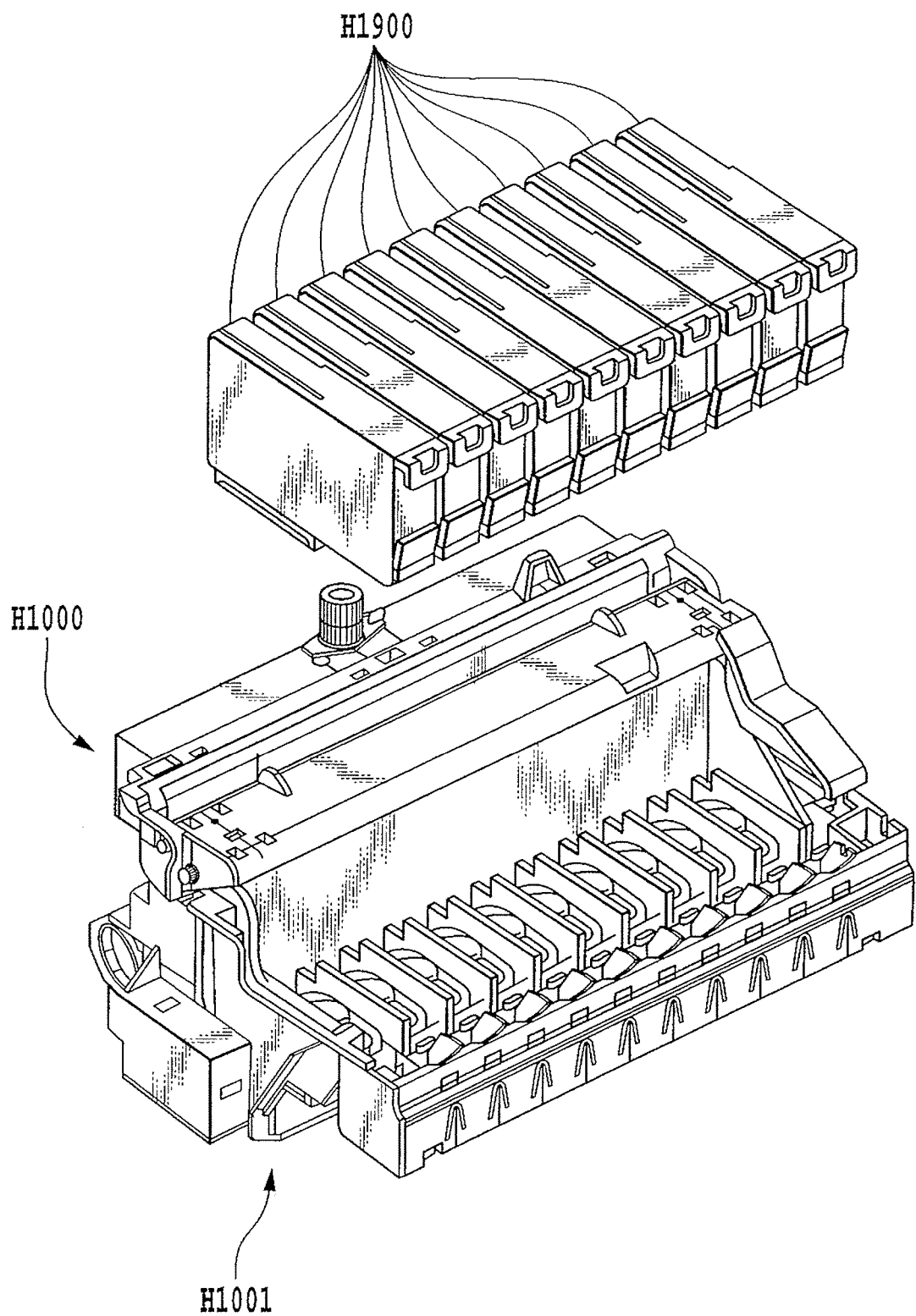
FIG. 21 is a perspective view showing a situation in which ink tanks are attached to a head cartridge employed in the embodiment.

FIG. 21 is a diagram showing how the ink tanks H1900 are attached to the head cartridge H1000 to which this embodiment is applied. The printing apparatus of this embodiment forms an image by use of the pigmented inks corresponding respectively to the ten colors. The ten colors are cyan (C), light cyan (Lc), magenta (M), light magenta (Lm), yellow (Y), black 1 (K1), black 2 (K2), red (R), green (G) and gray (Gray). For this reason, the ink tanks H1900 are prepared respectively for the ten colors. As shown in FIG. 21, each of the ink tanks can be attached to, and detached from, the head cartridge H1000. Incidentally, the ink tanks H1900 are designed to be attached to, and detached from, the head cartridge H1000 in a state where the head cartridge H1000 is mounted on the carriage M4000.

1.5 Configuration of Inks

Descriptions will be provided below for the ten color inks used in the present invention.

The ten colors used in the present invention are cyan (C), light cyan (Lc), magenta (M), light magenta (Lm), yellow (Y), black 1 (K1), black 2 (K2), gray (Gray), red (R) and green (G). It is desirable that all of the coloring agents used respectively for the ten colors should be pigments. In this respect, for the purpose of dispersing the pigments, publicly known dispersants may be used. Otherwise, for the purpose, it is sufficient that pigments surfaces are modified by use of a publicly known method, and that self-dispersants are added thereto. In addition, coloring agents used for at least some of the colors may be dyes as long as the use agrees with the spirit and scope of the present invention. Furthermore, coloring agents used for at least some of the colors may be what are obtained by harmonizing pigments and dyes in color, and a plurality of kinds of pigments may be included therein. Moreover, as for the ten colors of the present invention at least one kind of substance selected from the group consisting of an aqueous organic solvent, an additive, a surfactant, a binder and an antiseptic may be included in therein as long as the inclusion is within the spirit and the scope of the present invention.

The ink of the present invention is used in an ink jet head and way also be used as ink contained in an ink container or ink for refilling the ink container. In particular, the present invention has an excellent effect on an ink jet printing technique which uses a printing head including an element that generates thermal energy causing the film boiling in ink as an element for generating energy to be utilized for ejecting ink.

As for a representative constitution and principle thereof, it is preferable to use a basic principle, for example, disclosed in the specifications of U.S. Pat. Nos. 4,723,129 and 4,740,796. This technique can be applied to both the so-called "on-demand type" and the "continuous type," and in particular, the technique is effective in the case of the "on-demand type." In the "on-demand type," at least one driving signal corresponding to printing information is applied to an electrothermal transducer placed to correspond to a sheet or a liquid path in which ink is held. The driving signal is intended to give the ink a temperature rise more rapid than that of nucleate boiling, and causes the film boiling of the ink at a heat acting surface of a printing head by causing the electrothermal transducer to generate thermal energy. As a result, a bubble can be formed in the ink so as to correspond to this driving signal in a one-to-one relationship. The ink is ejected from an ink ejection port by the growth and shrinkage of this bubble, thus forming at least one ink droplet. By making this driving signal pulse-shaped, the growth and shrinkage of the bubble is immediately and appropriately performed at once. This is more preferable because, in particular, ink ejection excellent in responsiveness can be achieved. As this pulse-shaped driving signal, ones such as described in the specifications of U.S. Pat. Nos. 4,463,359 and 4,345,262 are suitable. It should be noted that as for the rate of temperature rise at the heat acting surface of the printing head, more excellent printing can be performed by employing conditions described in the specification of U.S. Pat. No. 4,313,124.

The constitution of the printing head is not limited to a combination (linear liquid passage or right-angle liquid passage) of ejection ports, liquid paths, and electrothermal transducers such as disclosed in each of the above-described specifications. For example, as described in the specifications of U.S. Pat. Nos. 4,558,333 and 4,459,600, a constitution may be employed in which a heat acting portion is placed in a curved region. Alternatively, the present invention is also applicable to atmosphere-communicating ejection techniques described in Japanese Patent Nos. 2,962,880 and 3,246,949 and Japanese Patent Application Laid-open No. 11-188870 (1999). In addition, the present invention is also applicable to a constitution (e.g., Japanese Patent Application Laid-open No. 59-123670 (1984)) in which a plurality of electrothermal transducers share an ejection port.

Moreover, the present invention can also exert an effect on a full-line printing head, that is, a printing head having a length corresponding to the width of a maximum-size printing medium on which the printing apparatus can make a print. The full-line printing head may have a constitution in which the length is satisfied by a constitution obtained by combining a plurality of printing heads such as disclosed in the above-described specifications. Alternatively, a constitution formed integrally as one printing head may be employed.

In addition, the present invention is also applicable to cases where various types of printing heads are used. For example, an exchangeable chip-type printing head may be employed which is attached to the apparatus body to be capable of being electrically connected to the apparatus body and being supplied with ink from the apparatus body. Alternatively, a cartridge-type printing head may be employed which has ink tanks integrally provided to the printing head itself.

Furthermore, from the viewpoint of further stabilizing effects of the present invention, it is preferable to add recovery means for performing a recovery process on the printing head, preliminary auxiliary means, and the like to the printing apparatus to which the present invention is applied. Specifically, these means include capping means and cleaning means for the printing head, means for expelling ink not contributing to image printing by the application of pressure or by suction, means for executing a preliminary ejection mode in which ink not contributing to image printing is ejected separately from a printing operation, and the like. In addition, means for performing preliminary heating on the printing head using electrothermal transducers, other heating elements, or a combination thereof, may be also included therein.

Next, preferable materials for ten color inks used in this embodiment of the present invention will be specifically described.

Pigments

Color pigments include organic pigments. Specifically, dyeing lake pigments such as acid dye lakes and basic dye lakes; insoluble azo pigments such as monoazo yellows, disazo yellows, β-naphthol pigments, naphthol AS pigments, pyrazolone pigments, and benzimidazolone pigments; and condensed azo pigments; azo lake pigments; and condensed polycyclic pigments such as phthalocyanine pigments, quinacridon pigments, anthraquinone pigments, perylene pigments, indigo pigments, dioxazin pigments, quinophthalone pigments, isoindolinone pigments, and diketopyrrolopyrrole pigments. Of course, color pigments are not limited to these, but other organic pigments may be employed.

As a pigment used as a black pigment, carbon black is suitable. For example, any of carbon blacks such as furnace black, lampblack, acetylene black, and channel black can be used. Additionally, a carbon black newly prepared for the present invention can also be used. However, the present invention is not limited to these, but any of publicly known carbon blacks can be used. Moreover, the black pigment is not limited to carbon blacks, but magnetic particulates of magnetite, ferrite, or the like, titanium black, or the like may be used.

Here, in order to disperse a pigment, a publicly known general dispersant may be used, or the surface of the pigment may be modified by a publicly known general method so that the pigment becomes self-dispersible.

Moreover, a water-soluble organic solvent, an additive, a surface-active agent, and a preservative can be added to ink. As materials for these, publicly known general materials can be respectively used.

2. Characteristic Constitution

Next, the constitutions of the front tray M7010 and the rear tray M7090 in a characteristic component of the present invention will be described in detail.

Figure 22:
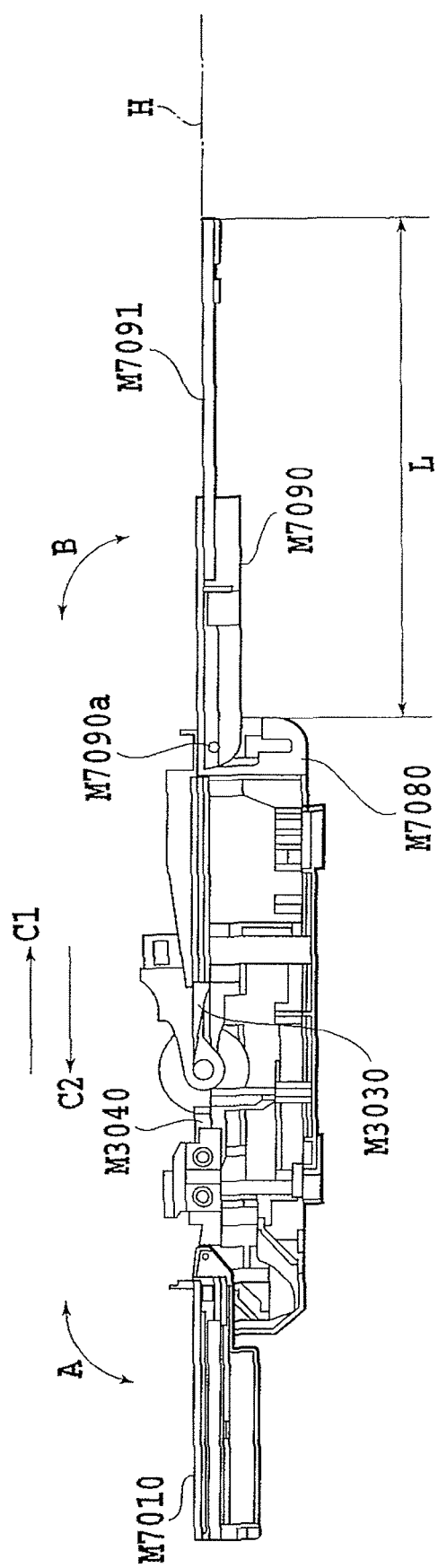
FIG. 22 is a side view of a characteristic component of the embodiment of the present invention.

The front tray M7010 is attached to the lower case M7080 so as to be rotatable in the direction of arrow A of FIG. 22. The front tray M7010 is closed as shown in FIG. 6 when accommodated, thus making the footprint of the printing apparatus small, and also preventing dust from entering inside the apparatus. The front tray M7010 is opened as shown in FIG. 22 when in use. A first function of the front tray M7010 is a function as a paper delivery tray which receives paper (printing medium) having an image formed thereon in front of the apparatus body. The paper is fed from a paper feeding tray M2060 on the rear side of the apparatus body. This first function makes it possible to maintain a favorable printing state by supporting a front end portion of the paper under printing and to hold a plurality of pieces of paper after printing as well.

Moreover, by raising the front tray M7010 once and then setting the front tray M7010 at a horizontal position as shown in FIG. 22, the front tray M7010 performs a second function as a flat-pass paper feeding tray during the aforementioned flat-pass printing such as shown in FIG. 14. At the time of flat-pass printing, a user inserts paper along the upper surface of the front tray M7010, and sets the paper according to an unillustrated side positioning rib and paper end indicator. In the front tray M7010, the slide-out sub-tray M3160 such as shown in FIGS. 7 and 12 is accommodated. This sub-tray M3160 can be pulled out according to the size of paper used.

Figure 23:
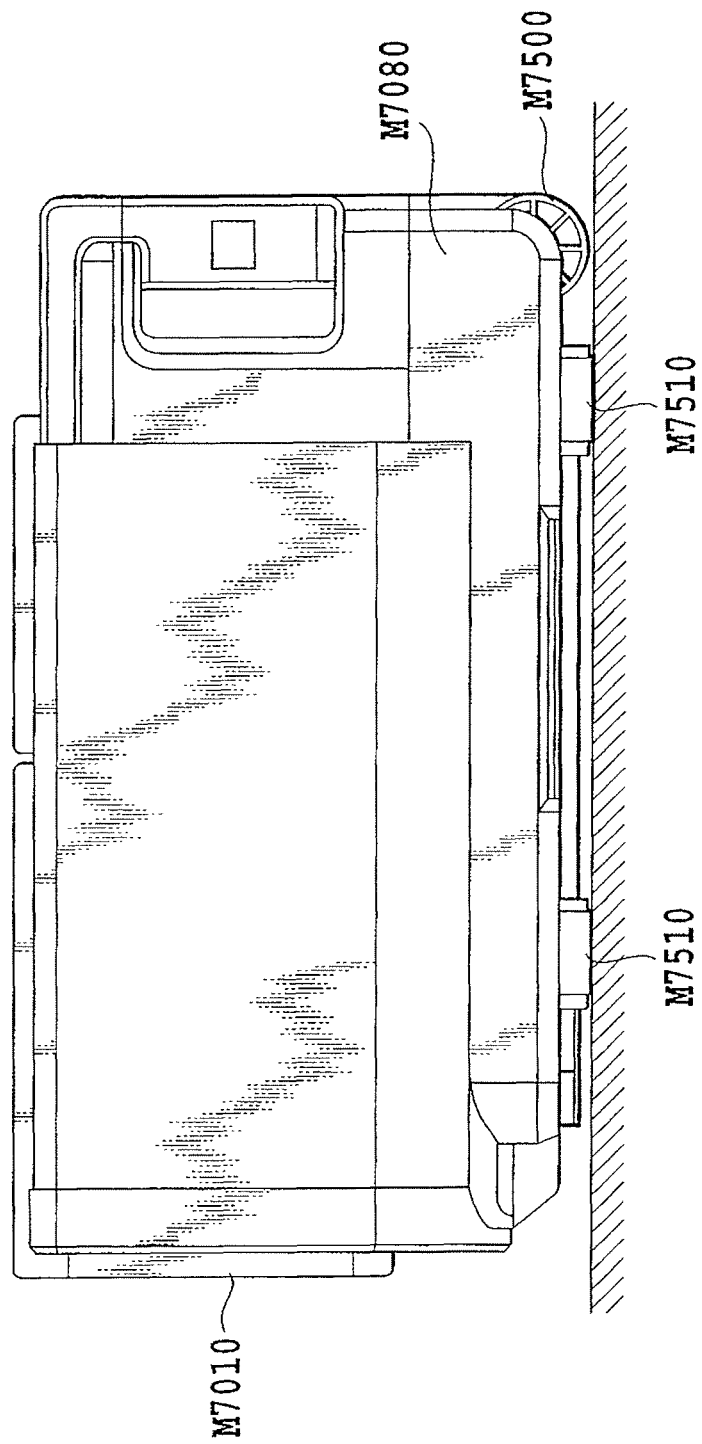
FIG. 23 is a side view for explaining a modified example of the embodiment of the present invention.
Figure 24:
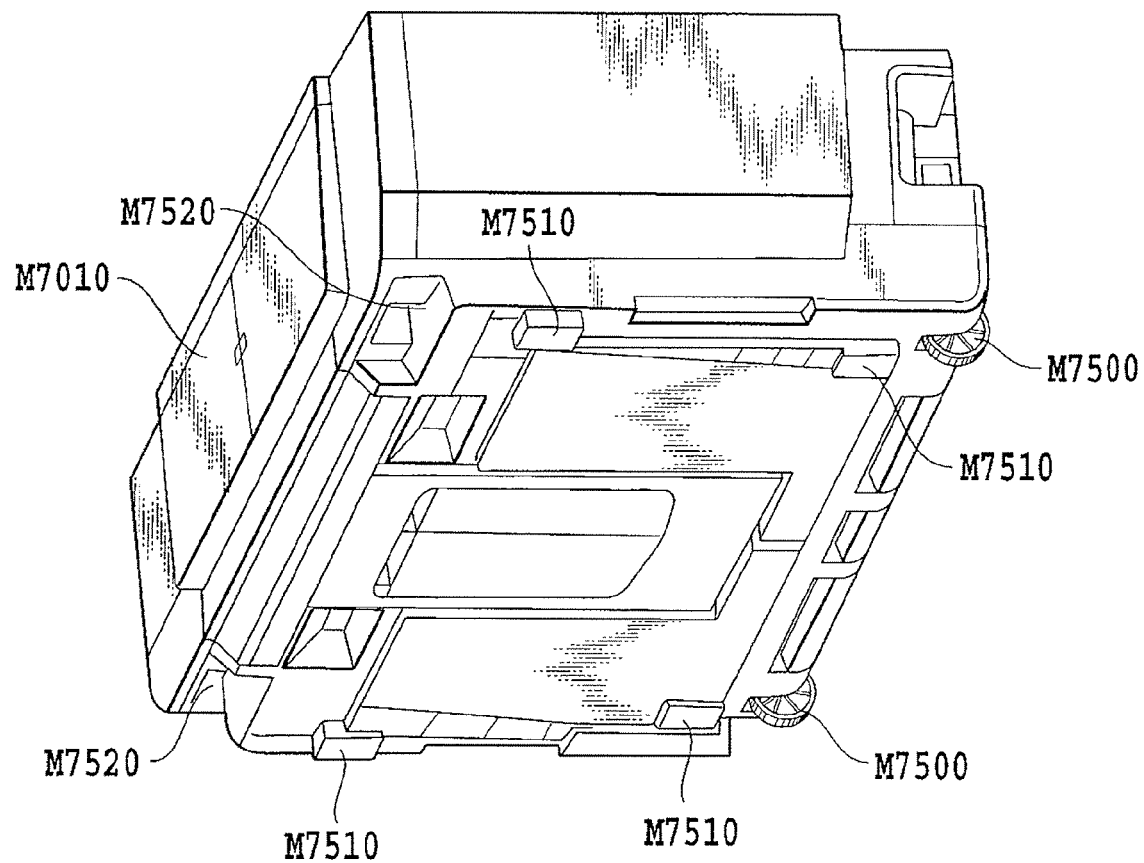
FIG. 24 is a perspective view of the printing apparatus in FIG. 23.

On the other hand, the rear tray M7090 is provided on the back side of the lower case M7080 so as to be rotatable about a shaft portion M7090a in the direction of arrow B as shown in FIG. 22. The rear tray M7090 is closed as shown in FIGS. 23 and 24 when accommodated, thus making the footprint of the printing apparatus small, and preventing dust from entering inside the apparatus. The rear tray M7090 is opened and held in an approximately horizontal state as shown in FIG. 22 when in use. In the rear tray M7080, the V-shaped sub-tray M7091 such as shown in FIGS. 13 and 22 is accommodated, and opened as needed to be used.

In this embodiment, at the time of flat-pass printing, the front tray M7010 and the rear tray M7090 are approximately at the same height as the platen M3040. Thus, during a period in which flat-pass printing is performed on paper fed from on the front tray M7010, the paper is held in a flat state. In flat-pass printing, paper fed from on the front tray M7010 is sent in the direction of arrow C1, a part of the paper is placed on the rear tray M7090, and then the paper switchbacks in the direction of arrow C2. The paper is delivered onto the front tray M7010 after an image is printed on the paper on the platen M3040. Members (including the front tray M7010, the rear tray M7090, and the platen M3040) which form a paper travel path during such flat-pass printing hold almost the entire region of paper in a flat state. That is, the paper travel path at the time of flat-pass printing forms a straight path which linearly conveys paper along plane H at a constant height.

If a front or back end of paper hangs down in the process of printing, there is a possibility that the paper may slightly slip in the conveyance roller M3060 due to its own weight of the paper and the resistance of a curved portion, and that this may adversely affect the accuracy of paper conveyance. In this embodiment, by holding paper in a flat state during flat-pass printing, the paper can be conveyed stably over the entire region to ensure the conveyance accuracy thereof.

In addition, in the case where a movable guide (paper guide flapper M3030 in this example) is provided at an intermediate point along the straight path which linearly conveys paper as described above, the movable guide is displaced to a horizontal position as shown in FIG. 22 when the straight path is used. By displacing the movable guide to the horizontal position as described above, the upper surface (paper guide surface) thereof is placed at approximately the same height as the upper surface of the platen M3040. Thus, paper can be stably conveyed while being maintained in a flat state to ensure the conveyance accuracy thereof.

Moreover, the length L of the rear tray M7090 when the sub-tray M7091 is opened as shown in FIG. 22 is set to be equal to or more than a distance by which the maximum-size paper protrudes on the back side of the apparatus when flat-pass printing is performed using maximum-size paper (A3+ size in this example). When the straight path is used, a space which allows the protruding of paper needs to be ensured on the back side of the apparatus. Opening the sub-tray M7091 enables a user to know the necessity of the space. In the case where a space on the back side of the apparatus is not enough, paper protruding at the time of flat-pass printing hits against a wall or other thing outside, and thus there is a possibility that folds may be made in the paper or that an end surface of the paper may be curled.

FIGS. 23 and 24 are views for explaining a modified example of this embodiment.

When the rear tray M7090 is opened or closed, it is expected that the apparatus will need to be moved. That is, the following may occur. The apparatus is used, being placed against a wall in the case of ordinary printing in which an image is printed by automatically feeding paper from the aforementioned paper feeding section, and the apparatus is moved forward to open the rear tray M7090 only in the case of flat-pass printing. In this example, in expectation of a situation in which the apparatus is moved as described above, two wheels M7500 are provided in a rear portion of the bottom surface of the apparatus as shown in FIGS. 23 and 24. These wheels M7500 are usually not grounded as shown in FIG. 23, but are grounded when the apparatus is tilted by holding a grip portion M7520 on the front side of the apparatus. By grounding the wheels M7500 in this way, the apparatus can be moved forward or backward with a very small force. This is very effective in the case where the apparatus is moved as described above.

Generally, the wheels M7500 are not grounded, and a plurality of rubber feet M7510 receive the weight of the apparatus. Accordingly, there is no possibility that the apparatus may slightly move due to vibrations during a printing operation or that the vibrations cannot be absorbed to cause image deterioration. Additionally, the apparatus has a power cable and an I/F cable connected thereto. However, since the amount of movement of the apparatus in the back-and-forth direction is very small, it is unnecessary in most cases to give slack in these cables in advance. Accordingly, the apparatus can be easily moved in the back-and-forth direction by merely tilting the apparatus by holding the grip portion M7520.

Other Embodiments

The rear tray M7090, the sub-tray M7091, and a position on the platen M3040 for restricting paper to a printing position where an image is printed on the paper, that is, a position facing the printing head, are not necessarily positioned at the same height. It is essential only that they are positioned approximately in the same plane and that paper can be conveyed along a conveyance path positioned in the plane. The plane does not need to be horizontal. In addition, the paper conveyance path does not necessarily need to be linear.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-262371, filed Sep. 9, 2005, which is hereby incorporated by reference herein in its entirety.

What is claimed is:

1. A printing apparatus which prints an image on a printing medium at a printing position, conveyed along a conveyance path, using a printing head, capable of applying ink to the printing medium, the printing apparatus comprising:
    first and second trays being capable of having the printing medium mounted thereon, the first tray being provided on a front side of the printing apparatus body, and the second tray being provided on a back side of the printing apparatus body; and
    a conveying unit configured to convey the printing medium through the printing position along the conveyance path, wherein if a flat-pass key is operated, the printing medium mounted on the first tray is conveyed by the conveying unit through the printing position along the conveyance path in a first direction toward the second tray without being printed on, and then the printing medium is conveyed by the conveying unit in a second direction opposite to the first direction so that the printing medium switchbacks,
    the printing medium is printed on at the printing position while the printing medium is conveyed by the conveying unit in the second direction toward the first tray and the printing medium is discharged on the first tray.

2. The printing apparatus according to claim 1, wherein the first and second trays are placed linearly across the printing position at which the image is printed on the printing medium by the printing head, and
    the conveying unit linearly moves the printing medium back and forth along the conveyance path linearly connecting the first and second trays across the printing position.

3. The printing apparatus according to claim 1, wherein the first tray is provided on the front side of the printing apparatus body to be openable, and
    the second tray is provided on the back side of the printing apparatus body to be openable.

4. The printing apparatus according to claim 1, further comprising:
    a movable conveyance guide provided between the conveyance path and a different conveyance path capable of conveying the printing medium, which connects the conveyance path and the different conveyance path when the printing medium moves in one direction, and which disconnects the conveyance path and the different conveyance path from each other when the printing medium moves in a direction opposite to the one direction,
    wherein the movable conveyance guide has a surface for guiding the printing medium, the surface being positioned approximately in the conveyance path when the conveyance path and the different conveyance path are disconnected from each other.

5. The printing apparatus according to claim 1, wherein the second tray has a size-adjustable mounting surface on which the printing medium can be mounted, and
    a maximum size of the mounting surface is a size in which the printing medium can be mounted on the second tray when the printing medium conveyed from ell the first tray moves a maximum distance on the second tray.

6. The printing apparatus according to claim 1, further comprising:
    a wheel on a bottom surface of the printing apparatus body on a back side thereof,
    wherein the wheel is not grounded when the apparatus body is installed, but the wheel is grounded when the front side of the printing apparatus body is raised.

7. A method of printing an image on a printing medium by conveying the printing medium through a printing position along a conveyance path, the method comprising the steps of:
    using a first tray and a second tray capable of having the printing medium mounted thereon, the first tray being provided on a front side of the printing apparatus body, and the second tray being provided on a back side of the printing apparatus body,
    wherein if a flat-pass key is operated, conveying the print medium mounted on the first tray through the printing position along the conveyance path in a first direction toward the second tray without being printed on,
    conveying the printing medium in a second direction opposite to the first direction so that the printing medium switchbacks, and printing an image on the printing medium when the printing medium is conveyed from the second tray through the printing position along the same conveyance path in a second direction opposite to the first direction toward the first tray.

8. The method according to claim 7, wherein the image is printed on the printing medium at the printing position, the printing position being a position on a platen for controlling the printing medium to a position facing a printing head capable of applying ink to the printing medium.

9. A printing apparatus, which prints an image on a printing medium at a printing position, the printing apparatus comprising:

a conveying roller and a pinch roller for nipping and for conveying the printing medium through the printing position; and a discharging roller for conveying the printing medium on which an image is formed at the printing position in a discharging direction, and for discharging the printing medium on a discharge tray, wherein, if a flat-pass key is operated, the printing medium mounted on the discharge tray is conveyed by the discharging roller through the printing position in a first direction opposite to the discharging direction without being printed on, the printing medium is conveyed between the conveying roller and the pinch roller which are parted, and wherein the conveying roller and the pinch roller nip the printing medium and convey the printing medium in the first direction and a second direction opposite to the first direction so that the printing medium switchbacks, the printing medium is printed while the printing medium is conveyed by the conveying roller and the pinch roller through the printing position in the second direction and discharged on the discharge tray by the discharging roller.

* * * * *